(12) United States Patent
Tokiwa et al.

(10) Patent No.: US 10,182,169 B2
(45) Date of Patent: Jan. 15, 2019

(54) INFORMATION PROCESSING APPARATUS, INFORMATION PROCESSING METHOD, AND NON-TRANSITORY RECORDING MEDIUM

(71) Applicants: Masafumi Tokiwa, Kanagawa (JP); Minami Ogawa, Tokyo (JP); Hidenobu Hashikami, Hrioshima (JP)

(72) Inventors: Masafumi Tokiwa, Kanagawa (JP); Minami Ogawa, Tokyo (JP); Hidenobu Hashikami, Hrioshima (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/602,287

(22) Filed: May 23, 2017

(65) Prior Publication Data

US 2017/0353620 A1     Dec. 7, 2017

(30) Foreign Application Priority Data

Jun. 2, 2016   (JP) ................................ 2016-110962
Apr. 10, 2017  (JP) ................................ 2017-077709

(51) Int. Cl.
*H04N 1/32* (2006.01)
*H04N 1/00* (2006.01)

(52) U.S. Cl.
CPC ..... *H04N 1/32101* (2013.01); *H04N 1/00244* (2013.01); *H04N 1/00432* (2013.01); *H04N 1/00464* (2013.01); *H04N 2201/0039* (2013.01); *H04N 2201/0094* (2013.01); *H04N 2201/3232* (2013.01); *H04N 2201/3242* (2013.01)

(58) Field of Classification Search
None
See application file for complete search history.

(56) References Cited

U.S. PATENT DOCUMENTS

2006/0262349 A1    11/2006  Moroi
2013/0055067 A1*    2/2013  Ichimi ............... H04N 1/00217
                                              715/234
(Continued)

FOREIGN PATENT DOCUMENTS

JP           4759436         8/2011

*Primary Examiner* — Helen Zong
(74) *Attorney, Agent, or Firm* — IPUSA, PLLC

(57) ABSTRACT

A Web browser is installed on an information processing apparatus coupled to a server apparatus that provides a single-page application. The Web browser obtains a Web content for displaying pages in the single-page application. The Web content includes screen definition information in which content elements are defined for respective page identification information items and includes configuration information in which a configuration between the page identification information items is defined. The Web browser creates, based on the configuration information, component information including, for the respective page identification information items, page components of the pages. When an operation for a page transition is performed, the Web browser displays a page after the transition based on a content element corresponding to a page identification information item of the page after the transition and on a page component corresponding to the page identification information item of the page after the transition.

10 Claims, 17 Drawing Sheets

(56) References Cited

U.S. PATENT DOCUMENTS

| | | | |
|---|---|---|---|
| 2015/0142953 A1* | 5/2015 | Bayen | H04L 67/22 |
| | | | 709/224 |
| 2015/0220495 A1* | 8/2015 | Takayama | G06F 3/0483 |
| | | | 715/230 |
| 2016/0165076 A1 | 6/2016 | Tokiwa et al. | |
| 2016/0277608 A1 | 9/2016 | Shirai et al. | |
| 2017/0139874 A1* | 5/2017 | Chin | G06F 17/211 |
| 2017/0220548 A1* | 8/2017 | Le Bescond de Coatpont | |
| | | | G06F 3/0484 |
| 2017/0353620 A1* | 12/2017 | Tokiwa | H04N 1/32101 |

\* cited by examiner

FIG.7

```
<div>
  <div id="page1">
    <div id="page1/tab1"></div>
    <div id="page1/tab2"></div>
  </div>
  <div id="page2">
  </div>
  <div id="page3">
  </div>
</div>
```

FIG.8

```
{
  "pages": [
    {
      "id": "page1",
      "tabs": [ "page1/tab1", "page1/tab2" ]
    },
    {
      "id": "page2"
    },
    {
      "id": "page3"
    }
  ]
};
```

FIG.10

| CURRENT PAGE | PREVIOUS PAGE |
|---|---|
| page1 | — |

| PAGE ID | PAGE COMPONENT | TAB ID | TAB COMPONENT | CURRENT TAB |
|---|---|---|---|---|
| page1 | ... | page1/tab1 | ... | page1/tab1 |
| | | page1/tab2 | ... | |
| page2 | ... | — | — | — |
| page3 | ... | — | — | — |

FIG.15

```
                                                    1100
<div>
 <div id="screen1">
  <div id="screen1/page1">
   <div id="screen1/page1/tab1"></div>
   <div id="screen1/page1/tab2"></div>
  </div>
  <div id="screen1/page2">
  </div>
  <div id="screen1/page3">
  </div>
 </div>
 <div id="screen2">
  <div id="screen2/page4">
  </div>
  <div id="screen2/page5">
  </div>
 </div>
</div>
```

FIG.16

```
{
  "screens":[
    {
      "id":"screen1",
      "pages":[
        {
          "id":"screen1/page1",
          "tabs":["screen1/page1/tab1","screen1/page1/tab2"]
        },
        {
          "id":"screen1/page2"
        },
        {
          "id":"screen1/page3"
        }
      ]
    },
    {
      "id":"screen2",
      "pages":[
        {
          "id":"screen2/page4"
        },
        {
          "id":"screen2/page5"
        }
      ]
    }
  ]
};
```

| CURRENT SCREEN-ITEM | CURRENT PAGE | PREVIOUS PAGE |
|---|---|---|
| screen1 | screen1/page1 | – |

| SCREEN ID | PAGE ID | PAGE COMPONENT | TAB ID | TAB COMPONENT | CURRENT TAB |
|---|---|---|---|---|---|
| screen1 | screen1/page1 | ... | screen1/page1/tab1 | ... | screen1/page1/tab1 |
| | | | screen1/page1/tab2 | ... | |
| | screen1/page2 | ... | – | – | – |
| | screen1/page3 | ... | – | – | – |
| screen2 | screen2/page4 | ... | – | – | – |
| | screen2/page5 | ... | – | – | – |

3000

INFORMATION PROCESSING APPARATUS, INFORMATION PROCESSING METHOD, AND NON-TRANSITORY RECORDING MEDIUM

CROSS-REFERENCE TO RELATED APPLICATIONS

The present application claims priority under 35 U.S.C. § 119 to Japanese Patent Application No. 2016-110962 filed on Jun. 2, 2016 and Japanese Patent Application No. 2017-077709 filed on Apr. 10, 2017, the contents of which are incorporated herein by reference in their entirety.

BACKGROUND OF THE INVENTION

1. Field of the Invention

The disclosures herein generally relate to an information processing apparatus, an information processing method, and a non-transitory recording medium.

2. Description of the Related Art

Architecture of a Web application called a single-page application is known in the related art. In the single-page application, resources of an entire Web page are obtained first from a server. Thus, for example, in a device whose ability of processing is relatively low, the single-page application is used in order to improve a response speed of a user during using a Web application.

For example, Japanese Examined Patent Publication No. 4759436 discloses a technique of providing a Web application to an image forming apparatus.

SUMMARY OF THE INVENTION

It is a general object of at least one embodiment of the present disclosure to provide an information processing apparatus, an information processing method, and a non-transitory recording medium that substantially obviate one or more problems caused by the limitations and disadvantages of the related art.

According to one aspect of the present disclosure, there is provision for an information processing apparatus coupled to a server apparatus that provides a single-page application via a network. A Web browser is installed on the information processing apparatus. The information processing apparatus includes: an obtaining unit configured to cause the Web browser to obtain, from the server apparatus, a Web content for displaying pages in the single-page application, the Web content including screen definition information in which content elements are defined for respective page identification information items for identifying the pages and including configuration information in which a configuration between the page identification information items is defined; a creating unit configured to cause the Web browser to create component information based on the configuration information included in the Web content obtained by the obtaining unit, the component information including, for the respective page identification information items of the pages to be displayed by the Web browser, page components that display the pages; and a display unit configured to, when an operation for a page transition is performed by a user, cause the Web browser to display a page after the transition based on a content element, among the content elements defined in the screen definition information, corresponding to a page identification information item of the page after the transition and based on a page component corresponding to the page identification information item of the page after the transition.

BRIEF DESCRIPTION OF THE DRAWINGS

FIG. 7 is a diagram illustrating an example of screen definition information according to the first embodiment;

FIG. 8 is a diagram illustrating an example of configuration information according to the first embodiment;

FIG. 10 is a table illustrating an example of state information according to the first embodiment;

FIG. 11 is a table illustrating an example of component information according to the first embodiment;

FIG. 15 is a diagram illustrating an example of screen definition information according to the second embodiment;

FIG. 16 is a diagram illustrating an example of configuration information according to the second embodiment;

FIG. 18 is a table illustrating an example of state information according to the second embodiment;

FIG. 19 is a table illustrating an example of component information according to the second embodiment.

DESCRIPTION OF THE PREFERRED EMBODIMENTS

In the following, embodiments of the present disclosure will be described with reference to the accompanying drawings. The present disclosure has an object to facilitate screen development in a single-page application.

First Embodiment

<System Configuration>

Figure 1:
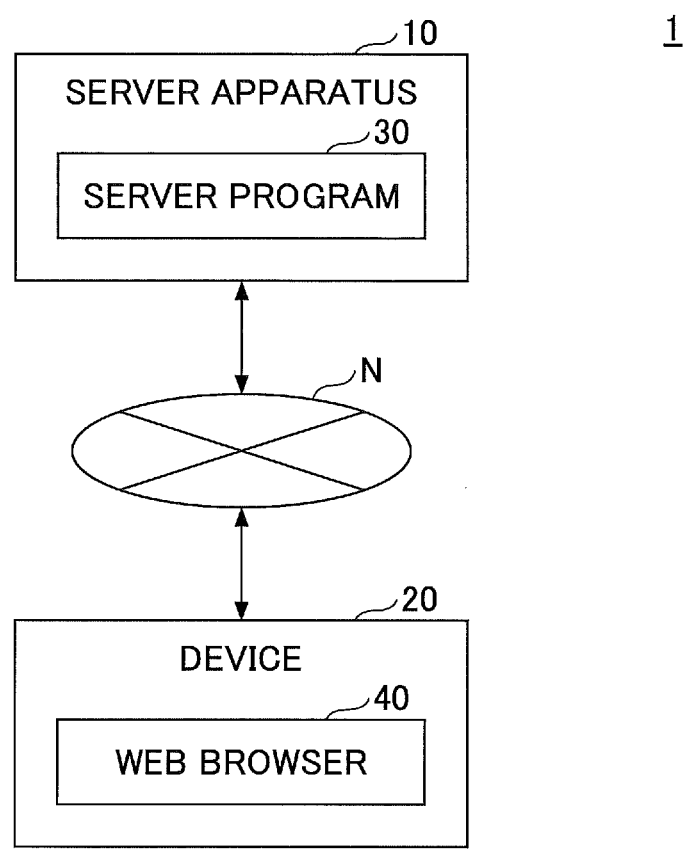
FIG. 1 is a block diagram illustrating an example of a system configuration of a Web system according to a first embodiment.

A system configuration of a Web system 1 according to a first embodiment will be described with reference to FIG. 1. FIG. 1 is a block diagram illustrating an example of the system configuration of the Web system 1 according to the first embodiment.

As illustrated in FIG. 1, the Web system 1 includes a server apparatus 10 and a device 20 that are coupled in a communicative manner via a wide network N such as the internet. Note that the network N may be an in-house Local Area Network (LAN), for example. The server apparatus 10 and the device 20 may be coupled through a wired connection or a wireless connection so that the server apparatus 10 and the device 20 can communicate with each other.

The server apparatus 10 is an information processing apparatus that serves as a Web server or an application server. A server program 30 is installed in the server apparatus 10 to cause the server apparatus 10 to function as the Web server or the application server.

The server apparatus 10 provides, to the device 20, a single-page application (SPA) by the server program 30. Note that the server program 30 may be configured with a plurality of programs or modules. The server apparatus 10 may be realized by one or more information processing apparatuses.

The device 20 is an image forming apparatus such as a Multi-Function Peripheral (MFP) that functions as a Web client. A Web browser 40 is installed on the device 20. Using the Web browser 40, the user of the device 20 (information processing apparatus) can use the single-page application that is provided from the server apparatus 10.

In the following, the device 20 is described as the image forming apparatus. However, the device 20 is not limited to the image forming apparatus. For example, the device 20 may be a device such as a notebook personal computer (PC), a desktop PC, a smartphone, a tablet terminal, a projector, a teleconference system, a digital camera, or a game machine. In other words, various electronic devices, which can install the Web browser 40 and can input/output electronic data, may be used as the device 20.

Figure 2:
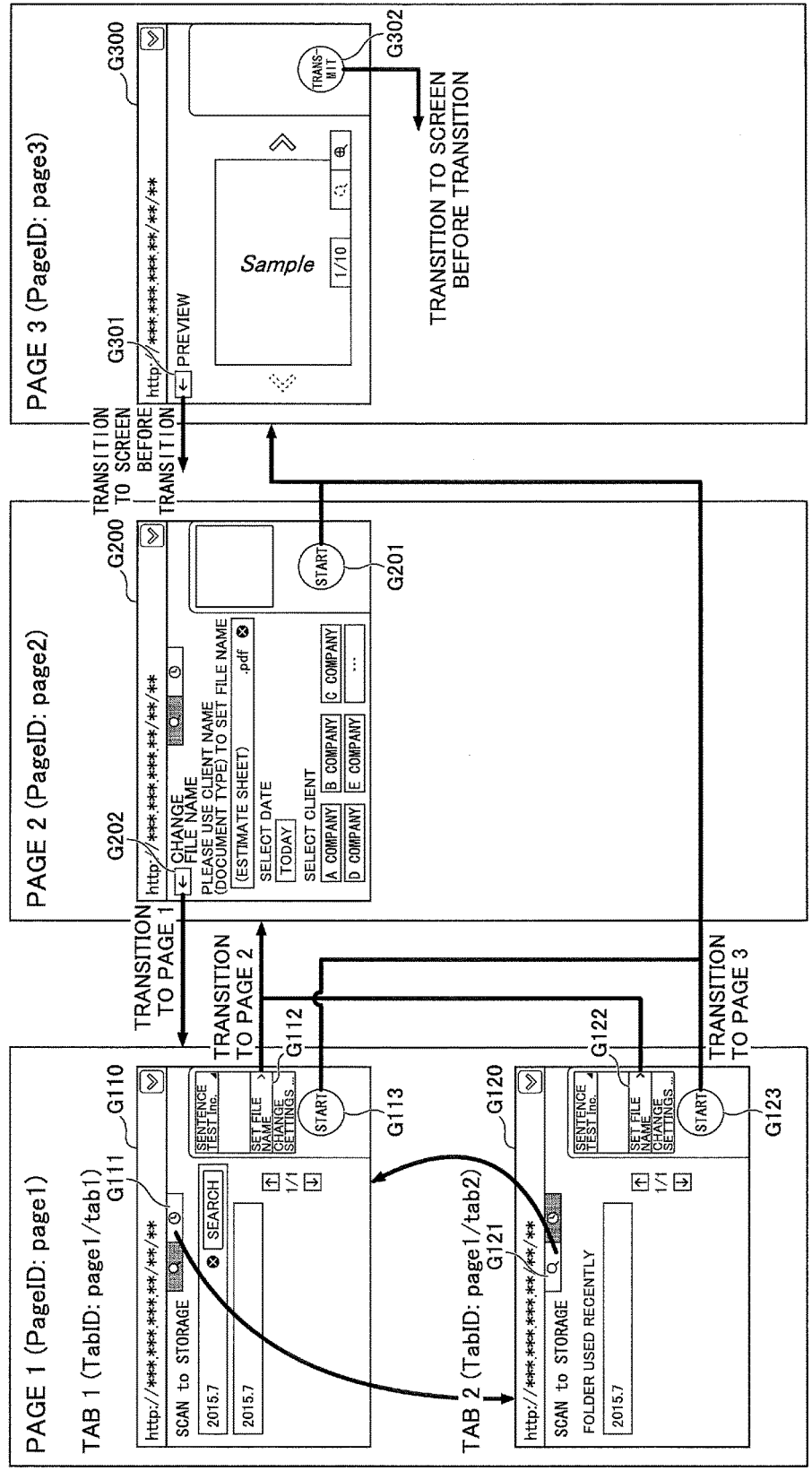
FIG. 2 is a diagram describing an example of screen transitions according to the first embodiment.

Screen transitions in the single-page application displayed by the Web browser 40 of the device will be described with reference to FIG. 2. FIG. 2 is a diagram describing an example of the screen transitions according to the first embodiment. The user of the device 20 uses the Web browser 40 to obtain, from the server apparatus 10, various kinds of information such as HyperText Markup Language (HTML) and JavaScript (registered trade mark). Thereby, the user can use the single-page application.

As illustrated in FIG. 2, the single-page application that is provided by the server apparatus 10 displays a page 1 whose Page ID is "page1", a page 2 whose Page ID is "page2", and a page 3 whose Page ID is "page3". The page 1, whose Page ID is "page1", includes a tab 1 whose Tab ID is "page1/tab1" and a tab 2 whose Tab ID is "page1/tab2".

Here, it is assumed that a tab switching button G111 is pushed by the user in a screen G110 that displays the tab 1 in the page 1. In this case, the Web browser 40 displays, based on the Tab ID "page1/tab2" associated with the pushed tab switching button G111, a screen G120 that displays the tab 2 in the page 1.

Similarly, it is assumed that a tab switching button G121 is pushed by the user in the screen G120. In this case, the Web browser 40 displays, based on the Tab ID "page1/tab1" associated with the pushed tab switching button G121, the screen G110.

In this way, the Web browser 40 of the device 20 according to the first embodiment can switch, based on the Tab IDs for identifying the respective tabs, the respective tabs to be displayed in the page. In other words, the Web browser 40, can select a tab and a page, which are to be displayed, based on the tag ID associated with a button pushed by the user.

It is assumed that a transition button G112 is pushed by the user in the screen G110. In this case, the Web browser 40 displays, based on a Page ID "page2" associated with the pushed transition button G112, a screen G200 that displays the page 2. Similarly, in a case where a transition button G122 is pushed by the user in the screen G120, the Web browser 40 displays the screen G200 based on the Page ID "page2" associated with the pushed transition button G122.

In this way, the Web browser 40 of the device 20 according to the first embodiment can display, based on the Page IDs for identifying the respective pages, the respective pages. Similarly, the Web browser 40 can display the page 3 in a case where a screen transition button G113 is pushed in the screen G110, a screen transition button G123 is pushed in the screen G120, or a screen transition button G201 is pushed in the screen G200.

It is assumed that a transition button G202 is pushed by the user in the screen G200. In this case, based on the Page ID "page1" associated with the pushed transition button G202, the Web browser 40 displays the screen displayed last among the screen G110 and the screen G120. That is, the Web browser 40 displays the screen most recently displayed.

In this way, in a case where a tab is included in the page after the transition, the Web browser 40 of the device 20 according to the first embodiment displays, based on the Page IDs for identifying the respective page, the screen that displays the tab most recently displayed.

Further, it is assumed that a transition button G301 or a transition button G302 is pushed by the user in the screen G300. In this case, the Web browser 40 displays, based on the designation associated with the transition button G301 or the transition button G302, the screen before the transition. That is, the Web browser 40 displays the screen, displayed immediately before the screen G300, based on the designation that represents to display the screen before the transition.

In this way, the Web browser 40 of the device 20 according to the first embodiment displays, based on designation that represents displaying the screen before the transition, the screen displayed immediately before.

As described above, the Web browser 40 of the device 20 according to the first embodiment can cause the respective screens in the single-page application to transition based on the Page IDs and the Tab IDs associated with display components such as the buttons in the respective screens. Accordingly, a person such as a developer of the single-page application can define, with respect to the page components in the respective screens, the Page IDs, the Tab IDs, and the like of the pages, to which the developer desires to cause the screen to transitions. Thereby, the developer can easily create a relationship of transitions of screens.

<Hardware Configuration>

Hardware configurations of the server apparatus 10 and the device 20 according to the first embodiment will be described.

Figure 3:
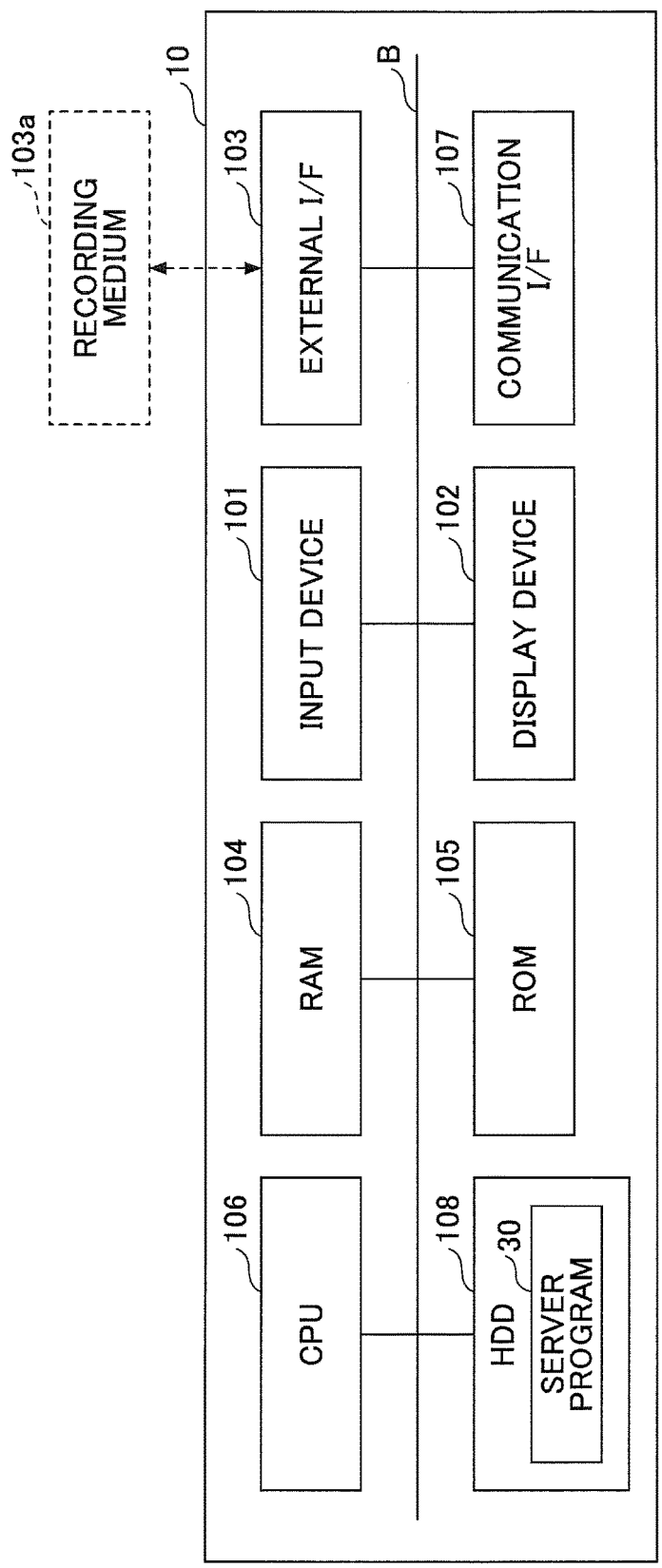
FIG. 3 is a block diagram illustrating an example of a hardware configuration of a server apparatus according to the first embodiment.

The hardware configuration of the server apparatus 10 according to the first embodiment will be described with reference to FIG. 3. FIG. 3 is a block diagram illustrating an example of the hardware configuration of the server apparatus 10 according to the first embodiment.

The server apparatus 10 server apparatus 10 illustrated in FIG. 3 includes an input device 101, a display device 102, an external I/F 103, and a Random Access Memory (RAM) 104. Further, the server apparatus 10 includes a Read Only Memory (ROM) 105, a Central Processing Unit (CPU) 106, a communication I/F 107, and a Hard Disk Drive (HDD) 18. These hardware elements are coupled with each other via a bus B.

The input device 101 includes a keyboard, a mouse, a touch panel, and the like. The user can use the input device 101 to input various operations. The display device 102 includes a display or the like to display a processing result by the server apparatus 10. Note that at least one of the input device 101 and the display device 102 may be coupled to the bus B to be used only when the at least one of the input device 101 and the display device 102 is necessary.

The communication I/F 107 is an interface that couples the server apparatus 10 to the network N. Thus, the server apparatus 10 can perform communication via the communication I/F 107.

The HDD 108 is a non-volatile storage device that stores programs and data. The programs and data stored in the HDD 108 may include an operating system (OS), which is basic software for controlling the entire server apparatus 10, the server program 30, various programs that provide various functions in the OS, and so on.

The server apparatus 10 may use a drive device using a flash memory (e.g., a solid state drive (SSD)) as a memory medium instead of the HDD 108. Further, the HDD 108 manages the stored programs and data using a predetermined file system, a data base (DB), and/or the like.

The external I/F 103 is an interface with one or more external apparatuses. The external apparatus may be a recording medium 103a or the like. Thus, the server apparatus 10 can read information (data) from the recording medium 103a and write information (data) on the recording medium 13a through the external I/F 103. The recording medium 103a may be a flexible disk, a CD, a DVD, an SD memory card, a USB memory, or the like.

The ROM 105 is a non-volatile semiconductor memory that can hold (store) programs and data even when the power source is powered off. The ROM 105 stores programs and data such as a basic input/output system (BIOS), an OS setup, and a network setup, which are executed when the server apparatus 10 is activated. The RAM 104 is a volatile semiconductor memory that temporarily holds (stores) the programs and the data.

The CPU 106 reads, from the storage device such as the ROM 105 and the HDD 108, the program(s) and/or the data into the RAM 104 to execute processing. The CPU 106 is an arithmetic device that actualizes control and functions of the entire server apparatus 10 by executing the processing.

The server apparatus 10 according to the first embodiment has the hardware configuration illustrated in FIG. 3 to actualize, various kinds of processing, which will be described later below.

Figure 4:
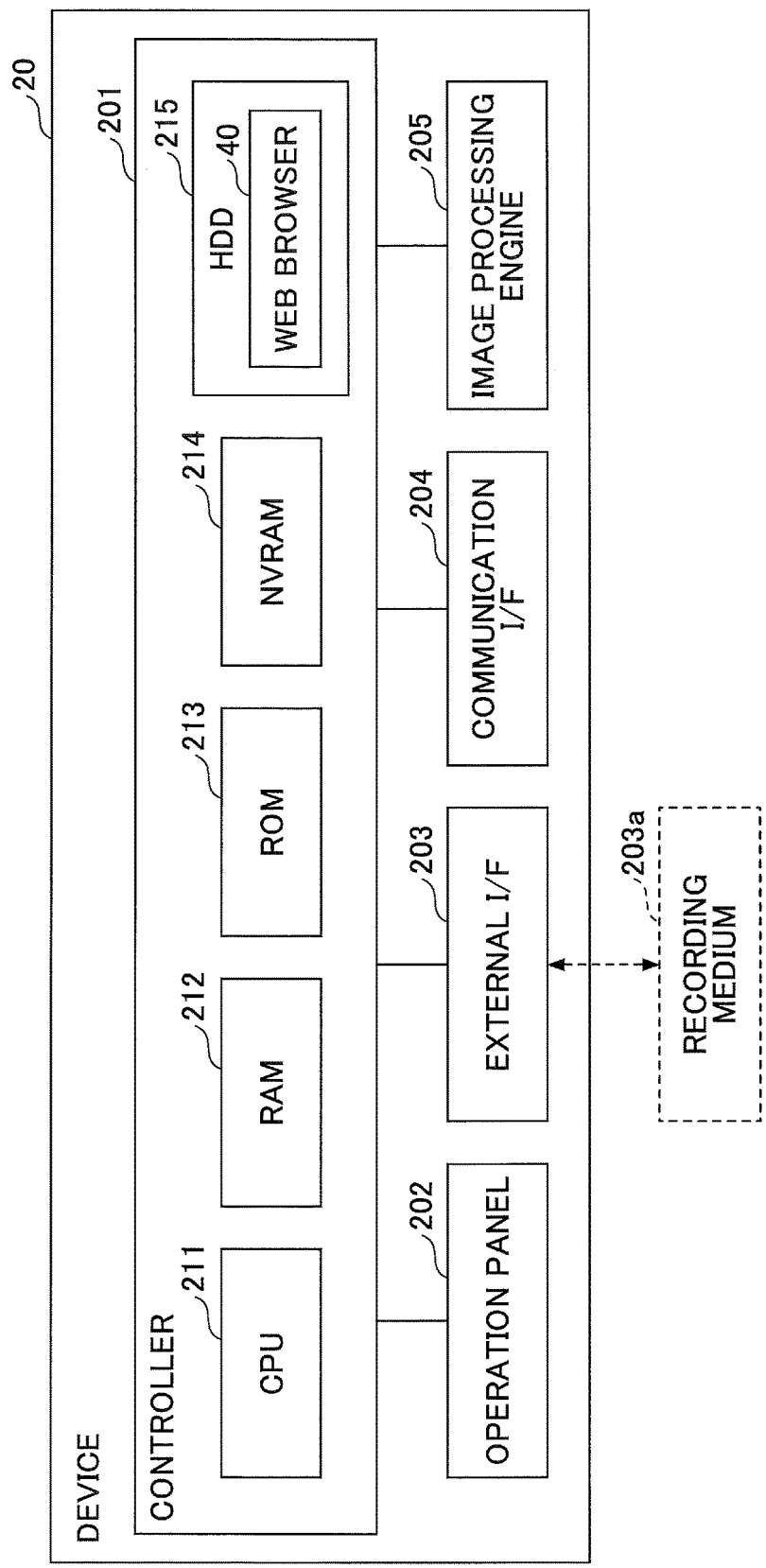
FIG. 4 is a block diagram illustrating an example of a hardware configuration of a device according to the first embodiment.

A hardware configuration of the device 20 according to the first embodiment will be described with reference to FIG. 4. FIG. 4 is a block diagram illustrating an example of the hardware configuration of the device 20 according to the first embodiment.

The device 20 illustrated in FIG. 4 includes a controller 201, an operation panel 202, an external I/F 203, a communication I/F 204, and an image processing engine 205.

Further, the controller 201 includes a CPU 211, a RAM 212, a ROM 213, a NVRAM 214, and a HDD 215.

The ROM 213 is a non-volatile semiconductor memory that can store various programs and/or data. The RAM 212 is a volatile semiconductor memory that temporarily holds (stores) programs and/or data. The NVRAM 214 is a non-volatile semiconductor memory that stores setting information (setup information) and the like, for example. The HDD 215 is a non-volatile semiconductor memory that stores various programs and/or data. The programs stored in the HDD 215 include the Web browser 40 and the like.

The CPU 211 is an arithmetic device that reads the program(s), the data, the setting information, or the like into the RAM 212 from the ROM 213, the NVRAM 214, the HDD 215, or the like to execute processing. Thereby, the arithmetic device actualizes control and functions of the entire device 20.

The operation panel 202 includes an input unit that receives input from a user and a display unit that displays data, an image, and/or the like. The external I/F 203 is an interface with one or more external devices. A recording medium 203a or the like may be the external device. Thus, the device 20 can read and/or write information (data) from and/or on the recording medium 203a via the external I/F 203.

For example, an IC card, a flexible disk, a CD, a DVD, an SD memory card, a USB memory, or the like may be the recording medium 203a.

The communication I/F 204 is an interface that couples the device 20 to the network N. Thus, the device 20 can perform communication via the communication I/F 204.

For example, the image processing engine 205 includes an apparatus such as a scanner apparatus that optically reads documents to generate image data, a plotter apparatus that performs printing on sheet materials such as paper, and a FAX communicating apparatus that performs FAX communication. Further, the image processing engine 205 may include a finisher that sorts printed sheet materials, an auto document feeder (ADF) that automatically feeds originals, or the like, for example.

The device 20 according to the first embodiment has the hardware configuration illustrated in FIG. 4 to actualize, various kinds of processing, which will be described later below.

<Functional Configuration>

Figure 5:
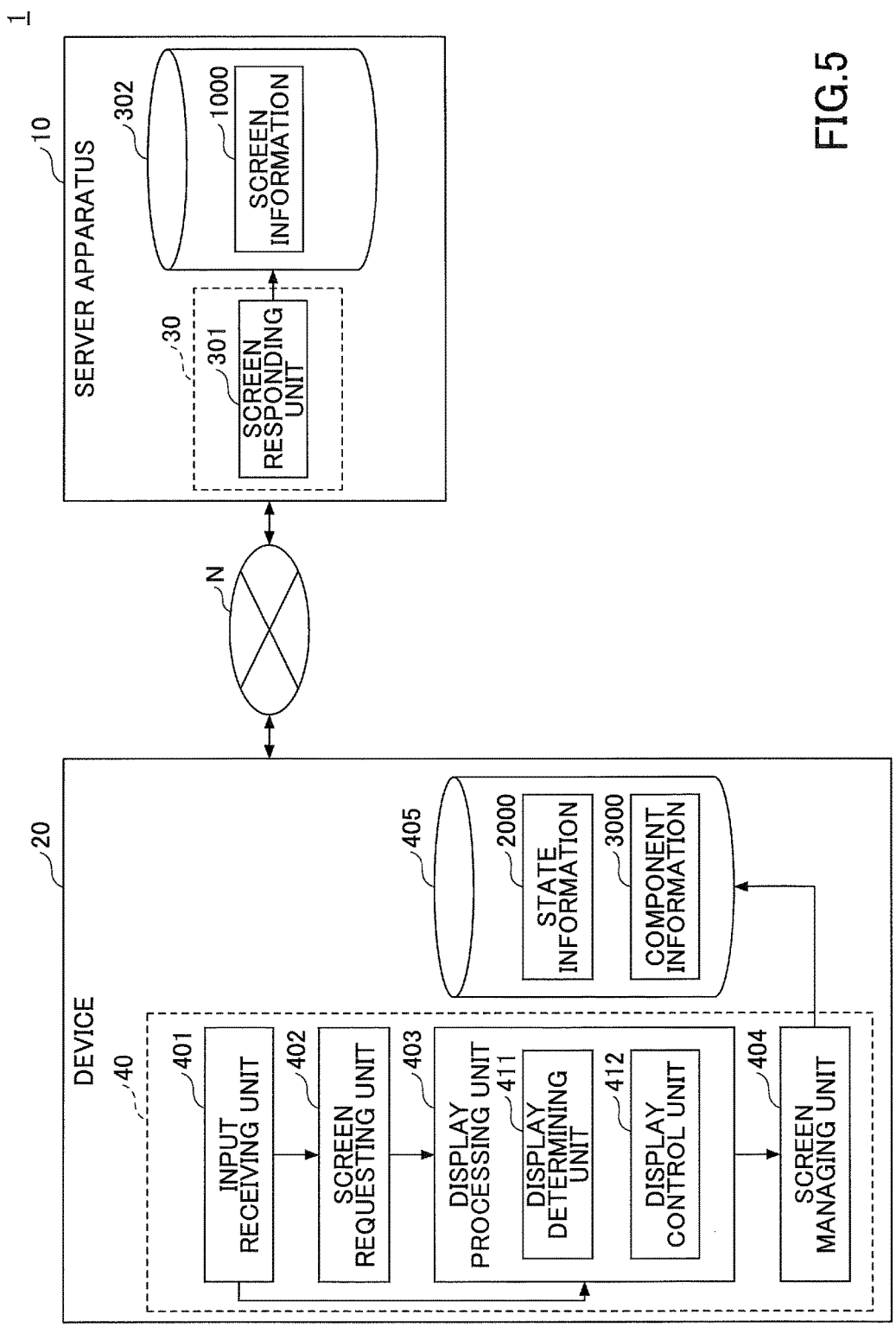
FIG. 5 is a block diagram illustrating an example of a functional configuration of the Web system according to the first embodiment.

A functional configuration of the Web system 1 according to the first embodiment will be described with reference to FIG. 5. FIG. 5 is a block diagram illustrating an example of the functional configuration of the Web system 1 according to the first embodiment.

The server apparatus 10 illustrated in FIG. 5 includes a screen responding unit 301. The screen responding unit 301 is realized by processing that the server program 30, installed in the server apparatus 10, causes the CPU 106 to execute.

Further, the server apparatus 10 includes a screen information storage unit 302. The screen information storage unit 302 may be realized by using the HDD 108, for example. The screen information storage unit 302 may be realized by using a storage device that is coupled to the server apparatus 10 via the network N.

The screen responding unit 301 obtains screen information from the screen information storage unit 302 in response to a screen obtaining request from a screen requesting unit 402 of the device 20, which will be described later below. Then, the screen responding unit 301 returns (transmits) the obtained screen information to the device 20. In this way, the single-page application is provided to the device 20.

The screen information storage unit 302 stores screen information 1000. Here, the screen information 1000 includes various kinds of information such as JavaScript, Cascading Style Sheets (CSS), and HTML for the device 20 to use the single-page application. The screen information 1000 is an example of a Web content.

The device 20 illustrated in FIG. 5 includes an input receiving unit 401, the screen requesting unit 402, a display processing unit 403, and a screen managing unit 404. These functional units are actualized by processing that the Web browser 40, installed in the device 20, causes the CPU 211 to execute.

Further, the device 20 includes a screen management information storage unit 405. The management information storage unit 405 may be realized by using the HDD 215, for example.

The input receiving unit 401 receives various operations input from the user. For example, the input receiving unit 401 receives, from the user, various operations such as an app starting operation for staring to use the single-page application and a screen transition operation for causing a screen to transition in the single-page application.

Further, in response to the app starting operation, the input receiving unit 401 transmits, to the display processing unit 403, an initial screen transition instruction that includes a page ID of a page to be displayed in the initial screen in the single-page application. Similarly, in response to the screen transition operation, the input receiving unit 401 transmits, to the display processing unit 403, a screen transition instruction that includes a Page ID (or Tab ID) of a page to be displayed in a screen after the transition.

In response to an instruction from the input receiving unit 401, the screen requesting unit 402 transmits, to the server apparatus 10, a screen obtaining request for obtaining the screen information 1000 from the server apparatus 10.

The display processing unit 403 performs processing relating to displaying of various screens. That is, the display processing unit 403 performs processing relating to transitions of screens. Here, the display processing unit 403 includes a display determining unit 411 and a display control unit 412.

The display determining unit 411 determines, based on a Page ID and a Tab Id included in an initial screen transition instruction or a screen transition instruction, a page and a tab after the transition.

The display control unit 412 displays, in the screen, the page and the tab determined by the display determining unit 411. In this way, various screens are displayed on the operation panel 202 of the device 20. That is, the screen on the operation panel 202 of the device 20 transitions.

For example, the Web browser 40 executes JavaScript or the like obtained from the server apparatus 10 to realize the display processing unit 403.

The screen managing unit 404 creates state information 2000 and component information 3000 based on various kinds of information including the screen information 1000 obtained from the server apparatus 10, and then stores the created state information 2000 and the created component information 3000 in the screen management information storage unit 405.

Here, the state information 2000 is information that manages a Page ID of a page currently displayed by the Web browser 40 and a Page ID of a page displayed in the previous time (last time). The component information 3000 is information that manages page components and tab components constituting respective screens.

For example, the Web browser 40 executes JavaScript or the like obtained from the server apparatus 10 to realize the screen managing unit 404.

The screen management information storage unit 405 stores the state information 2000 and the component information 3000. Note that details of the state information 2000 and the component information 3000 will be described later below.

<Details of Processing>

Figure 6:
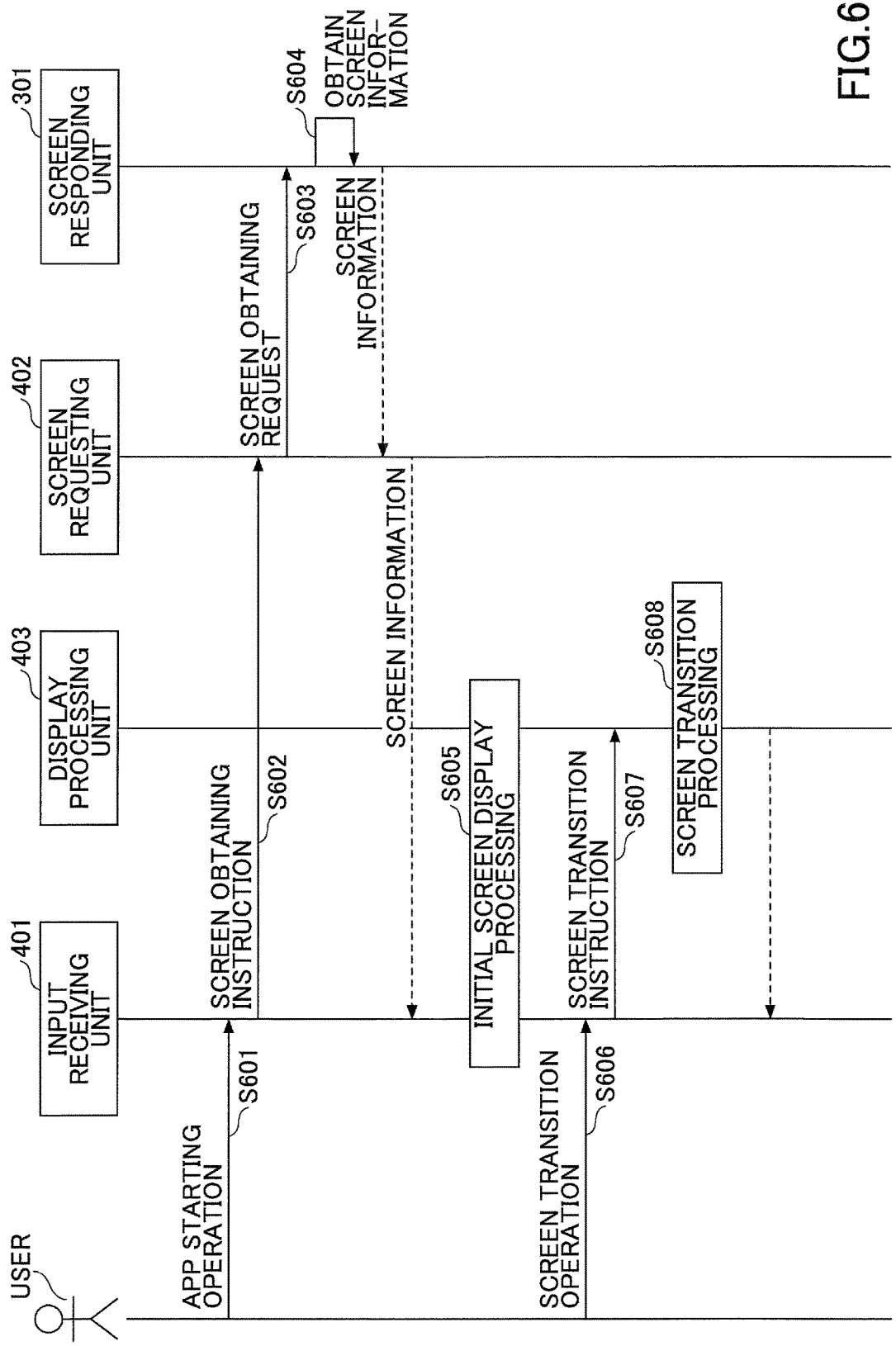
FIG. 6 is a sequence chart illustrating an example of entire processing of a screen transition according to the first embodiment.

Details of processing of the Web system 1 according to the first embodiment will be described. In the following, a screen transition will be described with reference to FIG. 6 in a case where the user of the device 20 uses the single-page application provided by the server apparatus 10. FIG. 6 is a sequence chart illustrating an example of entire processing of a screen transition according to the first embodiment.

First, the user of the device 20 performs an app starting operation (operation for starting an application). Then, the input receiving unit 401 of the device 20 receives the app starting operation from the user in step S601. Note that the app starting request may include a predetermined Uniform Resource Locator (URL) for starting to use the single-page application. The app starting request may be performed by pushing a shortcut icon for activating the Web browser 40, for example. The app starting operation may be performed by entering the predetermined URL to an address bar displayed by the Web browser 40.

The input receiving unit 401 of the device 20 transmits, to the screen requesting unit 402 in step S602, a screen obtaining instruction.

Next, upon receiving the screen obtaining instruction from the input receiving unit 401, the screen requesting unit 402 of the device 20 transmits, to the server apparatus 10 in step S603, a screen obtaining request. Note that the screen obtaining request transmitted by the screen requesting unit 402 may be a Hypertext Transfer Protocol (HTTP) request in which the URL included in the shortcut icon pushed by the user is defined, for example.

Next, upon receiving the screen obtaining request from the device 20, the screen responding unit 301 of the server apparatus 10 obtains the screen information 1000 from the screen information storage unit 302 to return (transmit) to the obtained screen information 1000 to the device 20 in step S604. For example, the screen responding unit 301 transmits a HTTP response including the screen information 1000 to the device 20 to return the screen information 1000 to the device 20. As described above, the device 20 causes the Web browser 40 to obtain, from the server apparatus 10, the screen information 1000 for displaying pages in the single-page application.

Here, the screen information 1000 returned from the server apparatus 10 includes screen definition information 1100 such as HTML and configuration information 1200, which represents a configuration of the pages and the tabs.

The screen definition information 1100 according to the first embodiment will be described with reference to FIG. 7. FIG. 7 is a diagram illustrating an example of the screen definition information 1100 according to the first embodiment.

As illustrated in FIG. 7, each page and each tab is defined with <div> in the screen definition information 1100. Thus, for example, it is possible to make a value of "display" property in CSS "none" to hide each of pages and tabs other than a page and/or a tab to be displayed. Similarly, for example, <div> elements may be deleted by a Document Object Model (DOM) to hide (delete) the pages and the tabs other than the page and/or the tab to be displayed. Note that <div> is a tag for defining one content (such as a page or a tab, for example) as one set (unit).

In other words, in the screen definition information 1100, content elements, which are represented by the div tags defined for the respective Page and Tab IDs, may be defined for the respective page IDs for identifying the pages.

The configuration information 1200 according to the first embodiment will be described with reference to FIG. 8. FIG. 8 is a diagram illustrating an example of the configuration information 1200 according to the first embodiment.

As illustrated in FIG. 8, the configuration information 1200 is information that represents a configuration of the Page IDs for identifying the pages and the Tab IDs for identifying the tabs. That is, in the configuration information 1200 illustrated in FIG. 8, Page IDs "page1", "page2", and "page3" are defined as the same hierarchy. In contrast, in the configuration information 1200 illustrated in FIG. 8, the Tab IDs "page1/tab1" and "page1/tab2" are defined as a hierarchy immediately below the hierarchy of the Page ID "page1".

In this way, in the configuration information 1200 illustrated in FIG. 8, the Page IDs and the Tab IDs are defined to constitute a hierarchic structure (tree structure). In other words, in the configuration information 1200, the configuration between the Page IDs may be defined so that the Page IDs are parallel to each other. Although only the page 1 includes the tabs in the first embodiment, at least one tab may be included in each of two or more pages of the pages in the single-page application provided from the server apparatus 10. In this case, the configuration between the Tab IDs, which identify the tabs included in the pages, and the Page IDs of the pages may be defined in the configuration information 1200 so that the hierarchy of the Tab IDs of the tabs included in the pages is lower than the hierarchy of the Page IDs of the pages including the tabs.

Although the "Page ID" of the page, including the tab, and the "information of identifying the tab in the page" are coupled through the slash "/" to define the Tab ID, the Tab IDs are not limited to this. That is, the Tab ID(s) may be defined to constitute a hierarchal structure with the Page ID(s). Accordingly, for example, the "page1/tab1" may be defined as "Page1·tab1", "page1-1", or the like.

Note that the configuration information 1200 illustrated in FIG. 8 is returned from the server apparatus 10 in a data format such as a JavaScript Object Notation (JSON) format, for example.

Next, upon receiving the screen information 1000 from the server apparatus 10, the device 20 performs in step S605 initial screen display processing of displaying an initial screen for using the single-page application based on the received screen information 1000. In this way, the preset initial screen such as the screen G110 as illustrated in FIG. 2 is displayed on the operation panel 202 of the device 20, for example. Note that details of the initial screen display processing will be described later below.

Next, the user of the device 20 performs a screen transition operation. Then, the input receiving unit 401 of the device 20 receives the screen transition operation from the user in step S606. For example, the screen transition operation may be performed by pushing, in the screen G110 illustrated in FIG. 2, a display component (such as the tab switching button G111 or the transition button G112) for displaying another page or tab. Note that the screen transition operation is similarly performed in the screen G120, the screen G200, the screen G300, or the like.

The input receiving unit 401 of the device 20 transmits a screen transition instruction to the display processing unit 403 in step S607. Note that the screen transition instruction includes a Page ID (or Tab ID) of a page to be displayed in the screen after the transition.

Next, upon receiving the screen transition instruction, the display processing unit 403 of the device 20 performs screen transition processing for causing the screen to transition based on the Page ID (or Tab ID) included in the received screen transition instruction. In this way, a screen transition from the currently displayed screen to another screen can be performed on the operation panel 202 of the device 20 such as a screen transition from the screen G110 to the screen G120 or a screen transition from the screen G120 to the screen G200, for example. Note that details of the screen transition processing will be described later below.

Note that every time the user of the device 20 desires a screen transition of causing a currently displayed screen to transition to another screen, the user may perform a screen transition operation of step S606 as described above.

Figure 9:
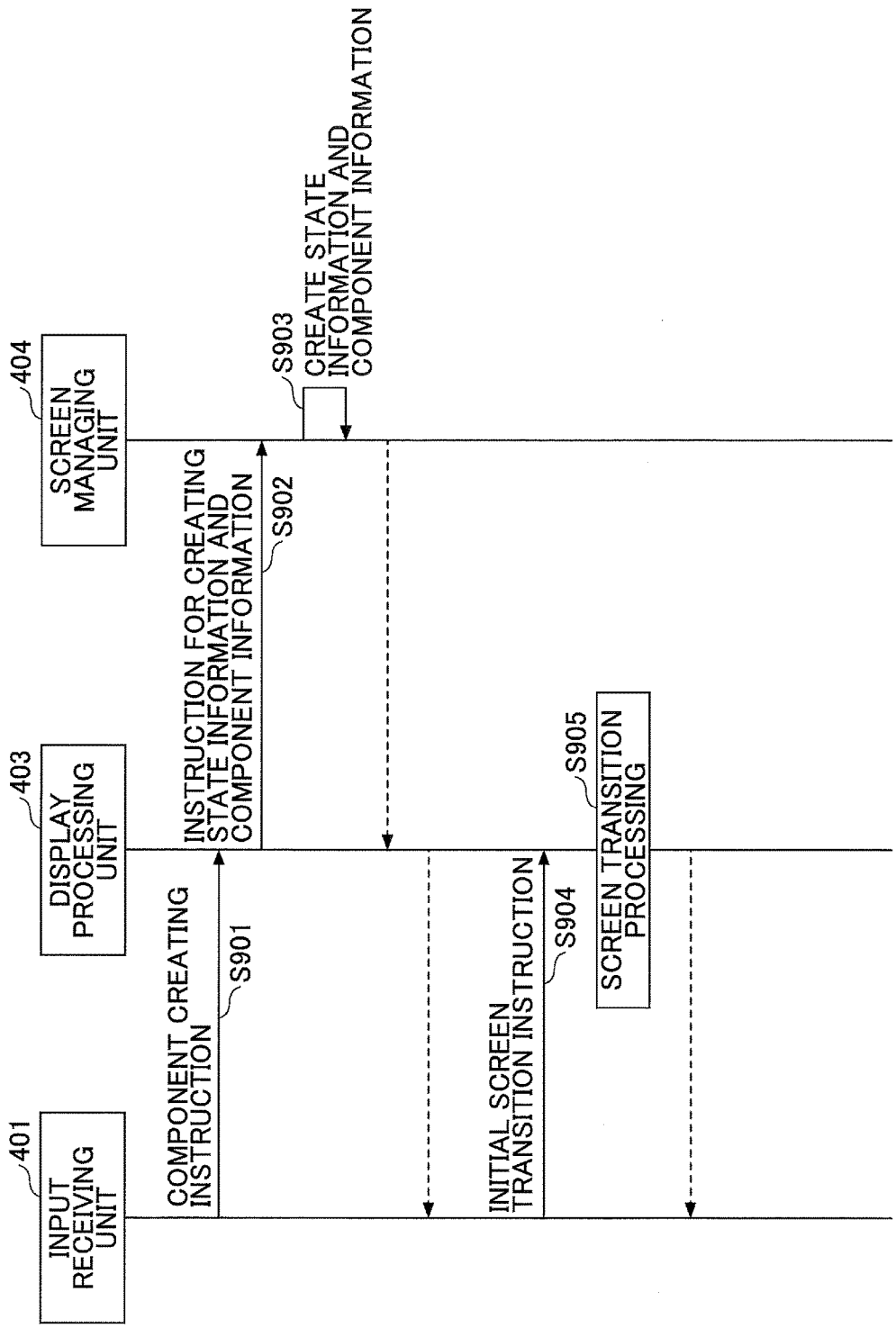
FIG. 9 is a sequence chart illustrating an example of processing of displaying an initial screen according to the first embodiment.

Details of the initial screen display processing of step S605 in FIG. 6 will be described with reference to FIG. 9. FIG. 9 is a sequence chart illustrating an example of processing of displaying an initial screen according to the first embodiment.

The input receiving unit 401 of the device 20 transmits a component creating instruction to the display processing unit 403 in step S901. Note that the component creating instruction includes the screen information 1000 obtained from the server apparatus 10.

Upon receiving the component creating instruction from the input receiving unit 401, the display processing unit 403 of the device 20 transmits, to the screen managing unit 404 in step S902, an instruction for creating state information and component information. Note that the instruction for creating the state information and the component information includes the configuration information 1200 included in the screen information 1000.

Next, upon receiving the instruction for creating the state information and the component information, the screen managing unit 404 of the device 20 creates state information 2000 and component information 3000 based on the configuration information 1200 included in the received creating instruction. In other words, the Web browser 40 creates the state information 2000 and the component information 3000 based on the configuration information 1200 included in the screen information 1000 obtained from the server apparatus 1000. Then, the screen managing unit 404 stores the created state information 2000 and the created component information 3000 in the screen management information storage unit 405 in step S903.

The state information 2000 that 10 created by the screen managing unit 404 will be described with reference to FIG. 10. FIG. 10 is a table illustrating an example of the state information 2000 according to the first embodiment.

As illustrated in FIG. 10, the state information 2000 according to the first embodiment includes "CURRENT PAGE" and "PREVIOUS PAGE" as data items. The Page ID of the page currently displayed in the screen of the device 20 is stored as the data item "CURRENT PAGE". The Page ID of the page displayed, in the previous time (last time), in the screen of the device 20 is stored as the data item "PREVIOUS PAGE".

For example, the screen managing unit 404 creates the state information 2000, which sets a Page ID of a page to be displayed as an initial screen of the single-page application as the "CURRENT PAGE". Specifically, for example, in a case where the Page ID of the page to be displayed as the initial screen of the single-page application is "page1", "page1" is set as the "CURRENT PAGE".

In this way, the state information 2000 illustrated in FIG. 10 is information that manages the Page ID of the page currently displayed by the device 20 and the Page ID of the page that has been displayed immediately before the current page is displayed. Accordingly, for example, in a case where the page whose Page ID is "page1" is being displayed in the screen of the device 20, "page1" is stored in the "CURRENT PAGE" of the state information 2000. Then, for example, in a case where the screen of the device 20 has transitioned from the page whose Page ID is "page1" to the page whose Page ID is "page2", "page2" is stored in the "CURRENT PAGE" of the state information 2000 and "page1" is stored in the "PREVIOUS PAGE".

Although the state information 2000 illustrated in FIG. 10 includes the data item "PREVIOUS PAGE" in which the Page ID of the page displayed in the previous time is stored, the state information 2000 is not limited to storing the Page ID of the page displayed immediately before displaying the page currently displayed. The state information 2000 may include one or more data items of storing history of Page IDs of pages that have been displayed.

The component information 3000 created by the screen managing unit 404 will be described with reference to FIG. 11. FIG. 11 is a table illustrating an example of the component information 3000 according to the first embodiment.

As illustrated in FIG. 11, the component information 3000 according to the first embodiment includes "PAGE ID", "PAGE COMPONENT", "TAB ID", "TAB COMPONENT", and "CURRENT TAB" as data items.

The Page IDs for identifying the respective pages are stored as the data item "PAGE ID". The page components constituting various screens are stored as the data item "PAGE COMPONENT". Note that the page component may be an object of the page generated by JavaScript included in the screen information 1000, for example.

The Tab IDs for identifying the respective tabs are stored as the data item "TAB ID". The tab components constituting various screens are stored as the data item "TAB COMPONENT". Note that the tab component may be an object of the tab generated by JavaScript included in the screen information 1000, for example.

The Tab ID displayed last among the respective tabs included in the page of the Page ID that is stored in the data item "PAGE ID" is stored as the data item "CURRENT TAB". For example, the screen managing unit 404 creates the component information 3000, in which the Tab ID of a tab to be displayed as the default in the corresponding page is set as the "CURRENT TAB". Specifically, for example, the "page1/tab1" is set as the data item "CURRENT TAB" for the page whose data item Page ID is "page1".

In a case where the page does not include a tab, a blank or a null value is set to each of the data items "TAB ID", "TAB COMPONENT", and "CURRENT TAB", for example.

In this way, in the component information illustrated in FIG. 11, each page is managed in association with a page component, tab components included in the corresponding page, and the Tab ID of a tab displayed last. Note that the number of tabs included in one page may be 0, 1, or two or more.

In other words, the component information 3000 may include, for the respective Page IDs of the pages to be displayed by the Web browser 40, the page components that display (constitute) the pages. Further, the component information 3000 may include, for the respective Tab IDs of the tabs included in the pages, the tab components that display (constitute) the tabs included in the pages. Note that at least one tab may be included in each of two or more pages of the pages in the single-page application provided from the server apparatus 10. Further, the component information 3000 may include, for respective page IDs of pages including tabs, Tab IDs displayed last among the tabs included in the pages.

Upon creating the state information 2000 and the component information 3000 by the screen managing unit 404, the input receiving unit 401 transmits, to the display processing unit 403 in step S904, an initial screen transition instruction. Note that the initial screen transition instruction includes the Page ID stored in the "CURRENT PAGE" of the state information 2000 created in the above step S903.

Then, upon receiving the initial screen transition instruction, the display processing unit 403 performs screen transition processing for causing the screen to transition to the initial screen based on the Page ID included in the received initial screen transition instruction. In this way, for example, the screen G110 as illustrated in FIG. 2 is displayed on the operation panel 202 of the device 20 as the initial screen of the single-page application. Note that details of the screen transition processing will be described later below.

As described above, the initial screen of the single-page application is displayed on the device 20 according to the first embodiment based on the screen information 1000 obtained from the server apparatus 10.

Figure 12:
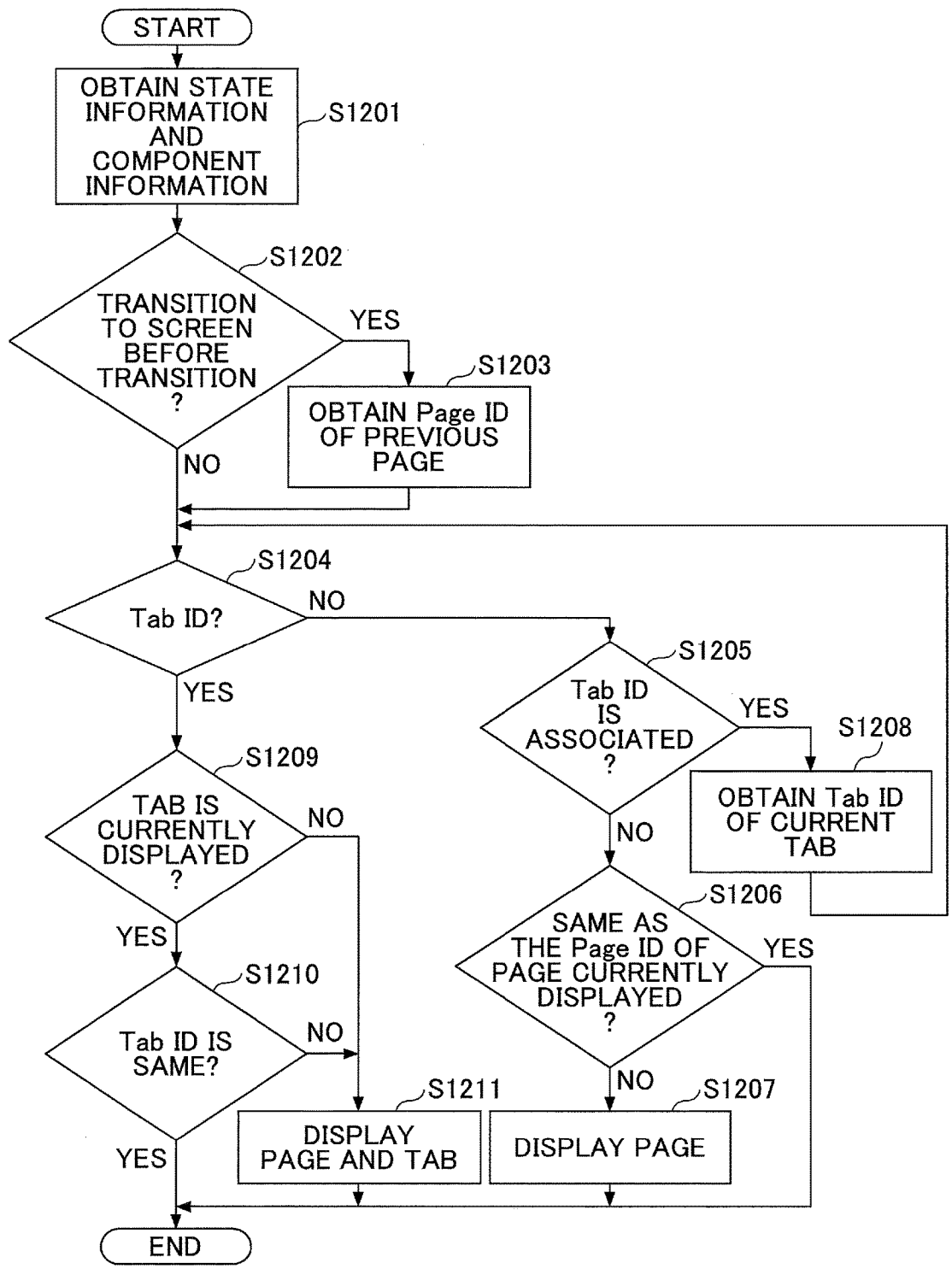
FIG. 12 is a flowchart illustrating an example of screen transition processing according to the first embodiment.

Details of the screen transition processing of step S905 in FIG. 9 and step S608 in FIG. 6 will be described with reference to FIG. 12. FIG. 12 is a flowchart illustrating an example of the screen transition processing according to the first embodiment. Note that in FIG. 12, the initial screen transition instruction and the screen transition instruction are simply referred to as "transition instruction" without distinguishing with each other. Information, which represents a transition destination such as a Page ID and a Tab ID to which the screen transitions included in the transition instruction, is referred to as "transition-destination-information". Here, the screen after the transition may be a screen to which the screen is going to transition to, and the screen before the transition may be a screen displayed immediately before displaying a screen currently displayed. In other words, the screen before the transition has transitioned to the screen currently displayed, and the screen currently displayed is going to transition to the screen after the transition.

First, the display processing unit 403 causes the screen managing unit 404 to obtain the state information 2000 and the component information 3000 from the screen management information storage unit 405 in step S1201.

Next, the display determining unit 411 determines in step S1202 whether the transition instruction received from the input receiving unit 401 is a transition instruction for causing the screen to transition to the screen before the transition (referred to as the "transition instruction for transitioning to the screen before the transition", hereinafter).

For example, in a case where the transition button G301 or the transition button G302 is pushed by the user in the screen G300 illustrated in FIG. 2, the input receiving unit 401 transmits, to the display processing unit 403, the transition instruction for transitioning to the screen before the transition. Such a transition instruction for transitioning to the screen before the transition may include, as transition-destination-information, designation "prev" or the like that represents to display the screen before the transition. Accordingly, the display determining unit 411 may determine whether "prev" is included, in the transition instruction, as the transition-destination-information to determine whether the transition instruction is a transition instruction for transitioning to the screen before the transition.

In a case of determining that the transition instruction received from the input receiving unit 401 is the transition instruction for transitioning to the screen before the transition (YES in step S1202), the display processing unit 403 obtains the Page ID stored in the data item "PREVIOUS PAGE" of the state information 2000 to have the transition-destination information in step S1203.

The display determining unit 411 determines whether the transition-destination information represents a Tab ID in step S1204.

In a case of determining that the transition-destination information does not represent the Tab ID (No in step S1204: that is, in a case where the transition-destination information represents a Page ID), the display determining unit 411 determines in step S1205 whether a Tab ID is associated with the Page ID in the component information 3000. That is, the display determining unit 411 determines whether a tab is included in the page of the transition-destination information (Page ID).

In a case of determining that the Tab ID is not associated with the transition-destination information (NO in step S1205: that is, in a case where the tab is not included in the page), the display determining unit 411 determines in step S1206 whether the Page ID, represented by transition-destination information, is the same as the Page ID of the page currently displayed in the screen.

That is, the display determining unit 411 obtains the Page ID stored in the data item "CURRENT PAGE" of the state information 2000, and determines whether the obtained Page ID is the same as the transition-destination information (Page ID).

In a case of determining that the Page ID of the page currently displayed is not the same as the transition-destination information (Page ID) (NO in step S1206), the display control unit 412 displays, in the screen, the page of the transition-destination information (Page ID) in step S1207. In this way, in the device 20, the screen transitions to the screen that displays the page.

As described above, for example, the display control unit 412 makes a value of "display" property in CSS "none" to display the page in the screen. Specifically, for example, in a case where the transition-destination information represents "page2", the value of "display" property in the CSS may be made to be "none" with respect to <div id="page1"> and <div id="page3"> of the screen definition information 1100 illustrated in FIG. 7. The DOM of the elements <div id="page1"> and <div id="page3"> of the screen definition information 1100 illustrated in FIG. 7 may be deleted.

In this way, the display control unit 412 displays the page component associated with the Page ID "page2" in the component information 3000 illustrated in FIG. 11 to display the page 2 in the screen. That is, the screen transitions to the screen of displaying the page 2.

Further, at this time, the display control unit 412 causes the screen managing unit 404 to update the data items "CURRENT PAGE" and "PREVIOUS PAGE" of the state information 2000. That is, after storing the Page ID stored in the data item "CURRENT PAGE" of the state information 2000 in the "PREVIOUS PAGE", the screen managing unit 404 stores the transition-destination information (Page ID) in the "CURRENT PAGE".

On the other hand, in a case of determining that the Page ID of the page currently displayed is the same as the transition-destination information (Page ID) (YES in step S1206), the display processing unit 403 completes the processing. In this case, in the device 20, the screen does not transition.

Here, in a case of determining that a Tab ID is associated with the transition-destination information (Page ID) (YES in step S1205), the display control unit 403 obtains a Tab ID, among Tab IDs stored in the data item "CURRENT TAB" of the component information 3000, associated with the transition-destination information (Page ID) and, sets the obtained Tab ID as the transition-destination information in step S1208.

That is, for example, in a case where the transition-destination information represents "page1", the display processing unit 403 obtains the Tab ID "page1/tab1", among the Tab IDs stored in the data item "CURRENT TAB" of the component information 3000 illustrated in FIG. 11, and sets the obtained Tab ID as the transition-destination information.

In a case of determining the transition-destination information represents the Tab ID (YES in step S1204), the display determining unit 411 determines in step S1209 whether a tab is currently displayed in the screen. That is, the display determining unit 411 determines whether the Page ID stored in the data item "CURRENT PAGE" of the state information 2000 is associated with the Tab ID in the component information 3000.

In a case of determining that the tab is currently displayed (YES in step S1209), the display determining unit 411 determines in step S1210 whether the Tab ID, represented by the transition-destination information, is the same as the Tab ID of the tab currently displayed. That is, the display determining unit 411 obtains the Tab ID, among the Tab IDs stored in the data item "CURRENT TAB" of the component information 3000, associated with the Page ID of the page currently displayed, and determines whether the obtained Tab ID is the same as the transition-destination information (Tab ID).

In a case where the display determining unit 411 determines that the Tab ID is not the same as the Tab ID of the tab currently displayed (NO in step S1210), the display control unit 412 displays in step S1211, based on the transition-destination information (Tab ID), in the screen, the tab of the Tab ID and the page including the tab. In this way, in the device 20, the screen transitions to the screen of displaying the page including the tab.

As described above, for example, the display control unit 412 makes a value of "display" property in CSS "none" to display the page and the tab in the screen. Specifically, for example, in a case where the transition-destination information represents "page1/tab2", the value of "display" property in the CSS may be made to be "none" with respect to <div id="page1/tab1">, <div id="page2">, and <div id="page3"> of the screen definition information 1100 illustrated in FIG. 7. The DOM of the elements <div id="page1/tab1">, <div id="page2">, and <div id="page3"> of the screen definition information 1100 illustrated in FIG. 7 may be deleted.

In this way, the display control unit 412 displays the page component, associated with the Page ID "page1" in the component information 3000 illustrated in FIG. 11, and the tab component associated with the Tab ID "page1/tab2" to display the tab 2 of the page 1 in the screen.

Further, at this time, the display control unit 412 causes the screen managing unit 404 to update the data items "CURRENT PAGE" and "PREVIOUS PAGE" of the state information 2000 and the data item "CURRENT TAB" of the component information 3000. That is, after storing the Page ID stored in the data item "CURRENT PAGE" of the state information 2000 in the "PREVIOUS PAGE", the screen managing unit 404 stores, in the "CURRENT PAGE", the Page ID associated with the transition-destination information (Tab ID) in the component information 3000. Further, the screen managing unit 404 updates, to the transition-destination information (Tab ID), the Tab ID, associated with the Page ID, of the data item "CURRENT TAB" of the component information 3000.

On the other hand, in a case of determining that the Tab ID of the page currently displayed is the same as the transition-destination information (Tab ID) (YES in step S1210), the display control unit 412 completes the processing. In this case, in the device 20, the screen does not transition.

As described above, according to the Web system 1 of the first embodiment, it is possible to designate an ID (identification information item) such as a Page ID and a Tab ID to cause the screen to transition in the device 20 that uses the single-page application that is provided from the server apparatus 10. Thus, according to the Web system 1 of the first embodiment, a person such as a developer of the single-page application, which is provided by the server apparatus 10, can define, with respect to the page components such as buttons in the respective screens, the Page IDs, the Tab IDs, and the like. Thereby, the developer can easily create a relationship of transitions between screens in the provided single-page application.

In other words, when an operation for a screen transition is performed by a user, the Web browser 40 may display a page after the transition based on a content element, among the content elements defined in the screen definition information 1100, corresponding to the Page ID of the page after the transition and based on the page component of the page after the transition. Further, in a case where the page after the transition includes a tab, the Web browser 40 may display the screen after the transition based on the tab component of the tab included in the page after the transition. Furthermore, in a case where a Tab ID is set as the CURRENT TAB for the page after the transition, the Web browser 40 may display the page after the transition based on the Tab ID set as the CURRENT TAB, which is the ID of the tab displayed last among the tabs included in the page after the transition.

Note that although a URL of each screen in the single-page application is the same according to the Web system 1 of the first embodiment, the URL is not limited to this. For example, a hash (#) may be added to a URL of each screen to be the URL of each screen. That is, for example, the URL of the screen of displaying the page 2 may be a URL obtained by adding the hash "#page2" to the URL of the single-page application. Similarly, for example, the URL of the screen of displaying the tab 2 of the page 1 may be a URL obtained by adding the hash "#page1/tab2" to the URL of the single-page application.

Thus, for example, the user of the device 20 can use functions such as a "return" button, and a bookmarking function provided by the Web browser 40.

Second Embodiment

Next, a second embodiment will be described. In the second embodiment, screen transitions will be described that are in consideration of a concept called "screen-item" constituted with a plurality of pages in addition to pages and tabs. That is, in a single-page application that is provided by the server apparatus 10 according to the second embodiment, transitions are also performed between screen-items in addition to transitions between pages and transitions between tabs.

In the descriptions of the second embodiment, differences between the second embodiment and the first embodiment will be mainly described. Descriptions of parts of the second embodiment, which have functions substantially similar to those of the first embodiment, and descriptions of parts of the second embodiment, which execute processing substantially similar to that of the first embodiment, are omitted as appropriate.

Figure 13:
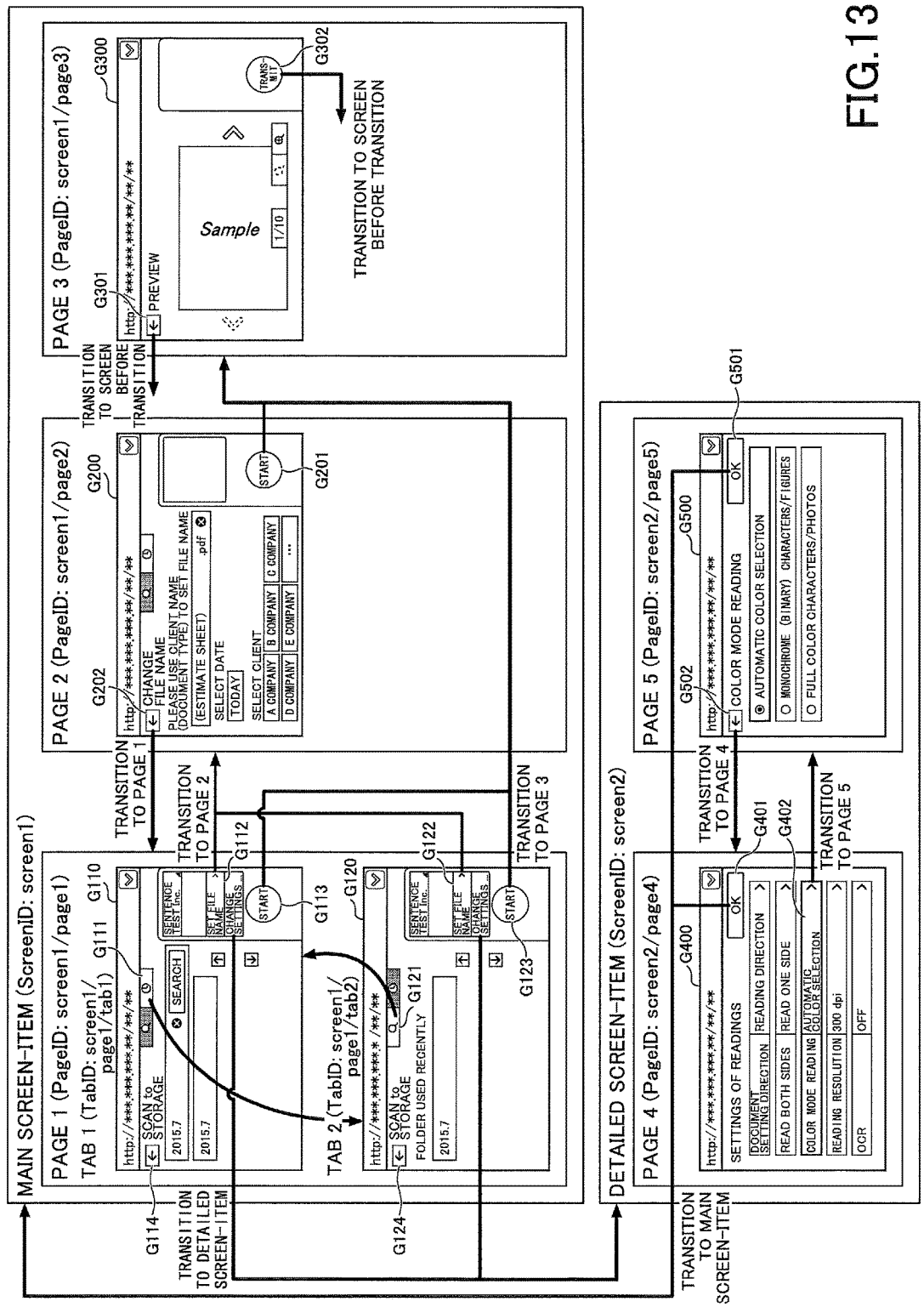
FIG. 13 is a diagram describing an example of screen transitions according to a second embodiment.

Screen transitions in the single-page application displayed by the Web browser 40 of the device will be described with reference to FIG. 13. FIG. 13 is a diagram describing an example of the screen transitions according to the second embodiment.

As illustrated in FIG. 13, the single-page application that is provided by the server apparatus 10 includes (can display) a main screen-item whose Screen ID is "screen1" and a detailed screen-item whose Screen ID is "screen2".

The main screen-item includes a page 1 whose Page ID is "screen1/page1", a page 2 whose Page ID is "screen1/page2", and a page 3 whose Page ID is "screen1/page3". Further, the page 1 includes a tab whose Tab ID is "screen1/page1/tab1" and a tab 2 whose Tab ID is "screen1/page1/tab2".

Similarly, the detailed screen-item includes a page 4 whose Page ID is "screen2/page4" and a page 5 whose Page ID is "screen2/page5".

Because screen transitions between the pages 1 to 3 in the main screen-item are substantially similar to the screen transitions according to the first embodiment, the descriptions of the screen transitions in the main screen-item are omitted here.

As illustrated in FIG. 13, it is assumed that a transition button G114 is pushed by the user in the screen G110 that displays the tab 1 in the page 1. In this case, based on the screen ID "screen2" associated with the pushed transition button G114, the Web browser 40 displays the screen displayed last among the screen G400 and the screen G500. That is, the Web browser 40 displays the screen most recently displayed. Note that in a case where a transition button G124 is pushed by the user in the screen G120 that displays the tab 2 in the page 1, the Web browser 40 similarly displays the screen based on the screen ID associated with the pushed transition button G124.

It is assumed that a transition button G401 is pushed by the user in the screen G400 that displays the page 4. In this case, based on the Screen ID "Screen1" associated with the pushed transition button G401, the Web browser 40 displays the screen displayed last among the screen G120, the screen G200, and the screen G300. That is, the Web browser 40 displays the screen most recently displayed. Similarly, in a case where a screen transition button G501 is pushed by user in the screen G500 that displays the page 5, the Web browser displays the screen displayed last among the screen G120, the screen G200, and the screen G300.

In this way, according to the device 20 of the second embodiment, a concept called "screen-item" including a plurality of screens in the single-page application is defined to perform screen transitions between the screen-items. Thus, for example, it is possible to cause the main screen-tem to include screens necessary for using the single-page application and to cause the detailed screen-item to include optional screens such as screens for changing setting values. Accordingly, a person such as a developer of the single-page application can unify (make) screens used for a common purpose into one screen-item to more easily create a relationship of transitions between the screens.

In a case where a transition button G402 is pushed by the user in the screen G400, the Web browser 40 displays the screen G500 based on the Screen ID "screen2/page5" associated with the pushed transition button G402. In a case where a transition button G502 is pushed by the user in the screen G500, the Web browser 40 displays the screen G400 based on the Screen ID "screen2/page4" associated with the pushed transition button G502.

<Details of Processing>

Figure 14:
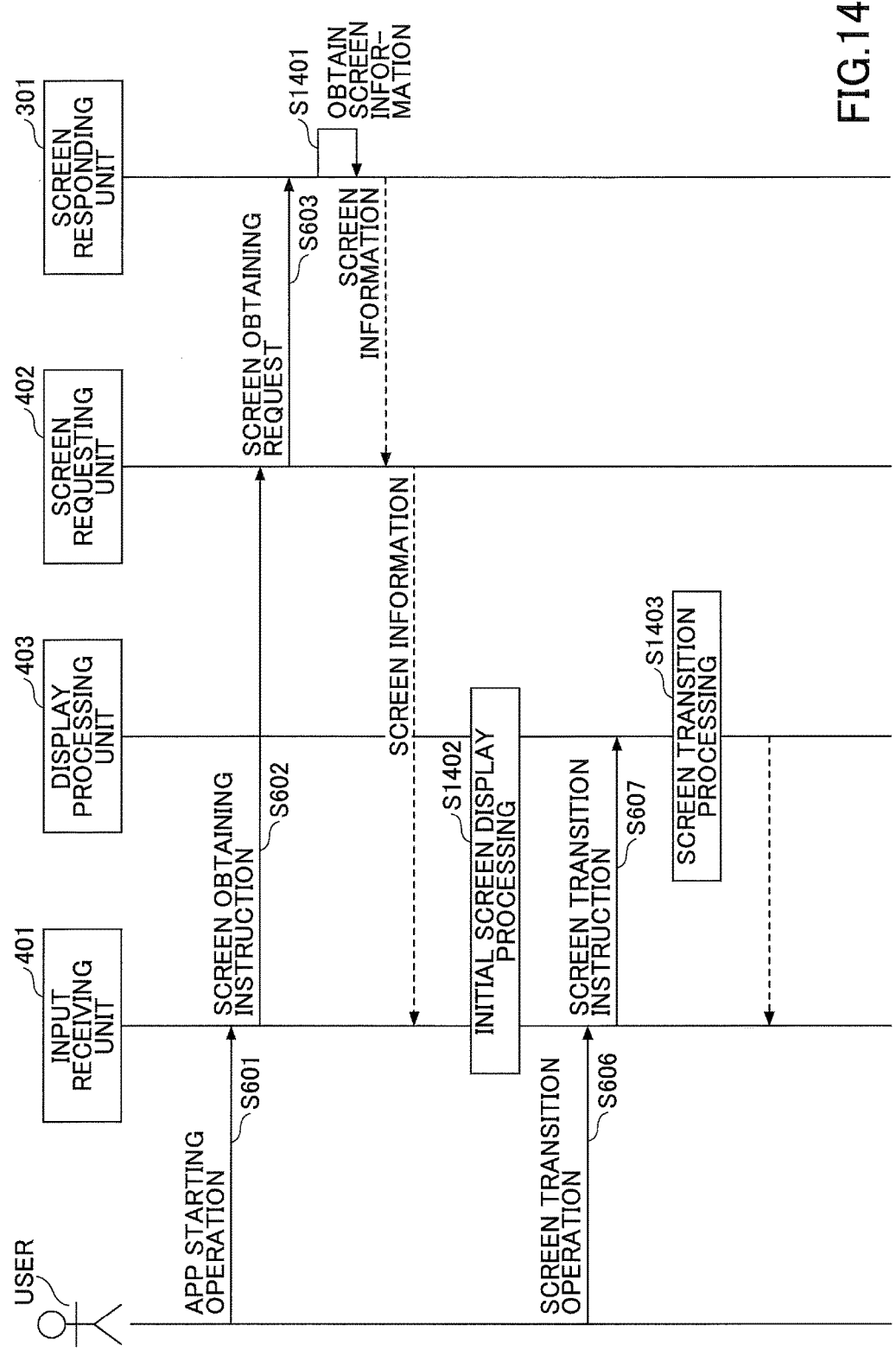
FIG. 14 is a sequence chart illustrating an example of entire processing of a screen transition according to the second embodiment.

Details of processing of the Web system 1 according to the second embodiment will be described. In the following, a screen transition will be described with reference to FIG. 14 in a case where the user of the device 20 uses the single-page application that is provided by the server apparatus 10. FIG. 14 is a sequence chart illustrating an example of entire processing of a screen transition according to the second embodiment.

Upon receiving the screen obtaining request from the device 20, the screen responding unit 301 of the server apparatus 10 obtains the screen information 1000 from the screen information storage unit 302 to return (transmit) to the obtained screen information 1000 to the device 20 in step S1401.

Here, the screen information 1000 returned from the server apparatus 10 includes screen definition information 1100 such as HTML and configuration information 1200, which represents a configuration of the screen-items, the pages, and the tabs.

The screen definition information 1100 according to the second embodiment will be described with reference to FIG. 15. FIG. 15 is a diagram illustrating an example of the screen definition information 1100 according to the second embodiment.

As illustrated in FIG. 15, each screen-item, each page, and each tab is defined with <div> in the screen definition information 1100 according to the second embodiment. Thus, for example, it is possible to make a value of "display" property in CSS "none" to hide each of screen-item(s), pages, and tabs other than a page and/or a tab in a screen-item to be displayed. Similarly, for example, <div> elements may be deleted by a Document Object Model (DOM) to hide (delete) the screen-item(s), the pages and the tabs other than the page and/or the tab in the screen-item to be displayed.

The configuration information 1200 according to the second embodiment will be described with reference to FIG. 16. FIG. 16 is a diagram illustrating an example of the configuration information 1200 according to the second embodiment.

As illustrated in FIG. 16, the configuration information 1200 according to the second embodiment is information that represents a configuration of the Screen IDs for identifying the screen-items, of the Page IDs for identifying the pages, and of the Tab IDs for identifying the tabs. That is, in the configuration information 1200 illustrated in FIG. 16, the Screen IDs "screen1" and "screen2" are defined as the same hierarchy.

Further, in the configuration information 1200 illustrated in FIG. 16, the Page IDs "screen1/page1", "screen1/page2", and "screen1/page3" are defined as a hierarchy immediately below the hierarchy of the screen ID "screen1". Similarly, in the configuration information 1200 illustrated in FIG. 16, the Page IDs "screen2/page4" and "screen2/page5" are defined as a hierarchy immediately below the hierarchy of the screen ID "screen2".

Furthermore, in the configuration information 1200 illustrated in FIG. 16, the Tab IDs "screen1/page1/tab1" and "screen1/page1/tab2" are defined as a hierarchy immediately below the hierarchy of the Page ID "page1".

In this way, in the configuration information 1200 illustrated in FIG. 16, the screen IDs, the Page IDs and the Tab IDs are defined to constitute a hierarchic structure (tree structure).

Next, upon receiving the screen information 1000 from the server apparatus 10, the device 20 performs in step S1402 initial screen display processing of displaying an initial screen for using the single-page application based on the received screen information 1000. In this way, the preset initial screen such as the screen G110 as illustrated in FIG. 13 is displayed on the operation panel 202 of the device 20, for example. Note that details of the initial screen display processing will be described later below.

Upon receiving the screen transition instruction transmitted in step S606, the display processing unit 403 of the device 20 performs in step S1403 screen transition processing for causing the screen to transition based on the Screen ID, the Page ID, or Tab ID included in the received screen transition instruction. In this way, a screen transition can be performed on the operation panel 202 of the device 20 such as a screen transition from the screen G110 to the screen G120, a screen transition from the screen G120 to the screen G200, or a screen transition from the screen G120 to the screen G400, as illustrated in FIG. 13, for example. Note that details of the screen transition processing will be described later below.

Figure 17:
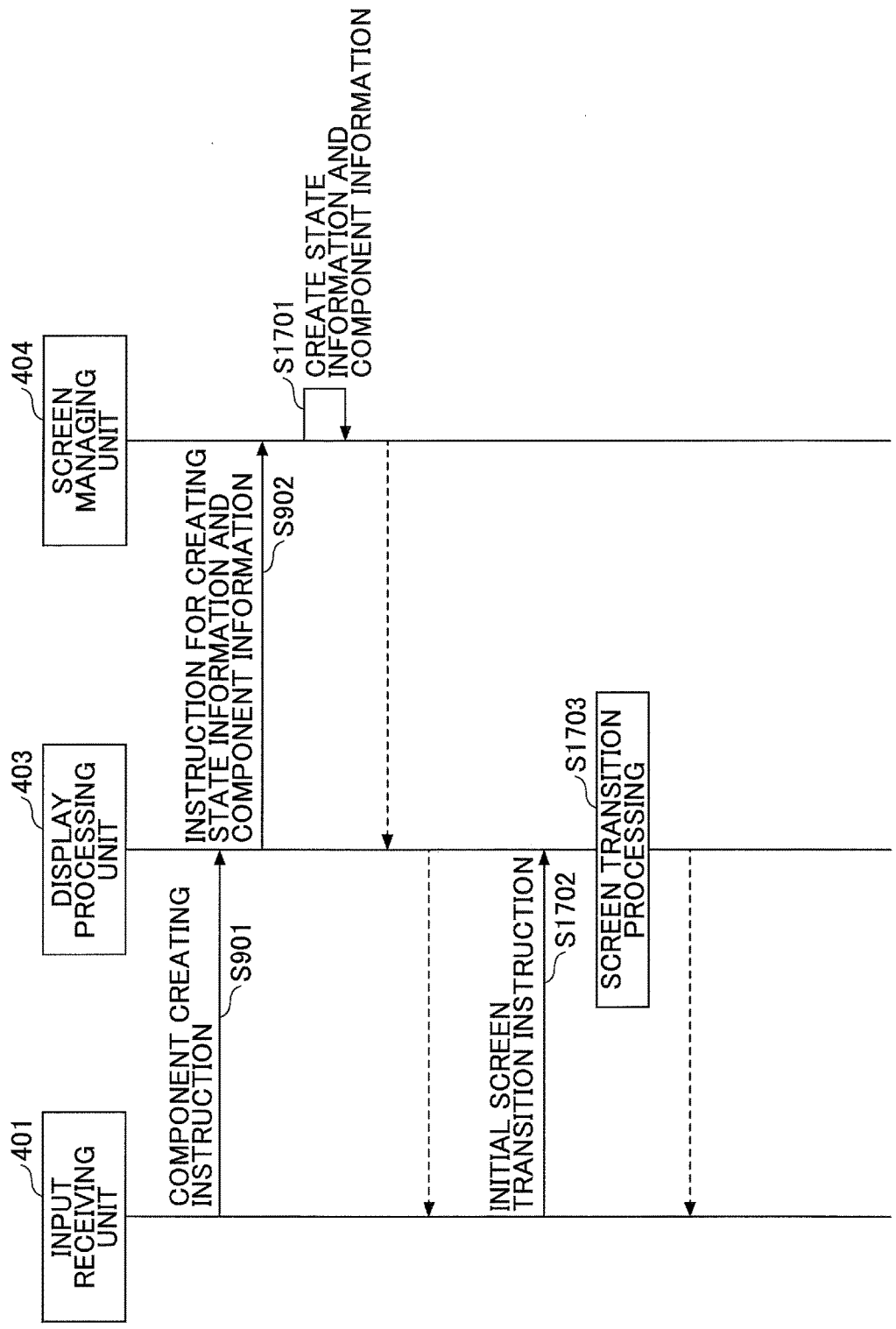
FIG. 17 is a sequence chart illustrating an example of processing of displaying an initial screen according to the second embodiment.

Details of the initial screen display processing of step S1402 in FIG. 14 will be described with reference to FIG. 17. FIG. 17 is a sequence chart illustrating an example of processing of displaying an initial screen according to the second embodiment.

Upon receiving the instruction for creating the state information and the component information, the screen managing unit 404 of the device 20 creates state information 2000 and component information 3000 based on the configuration information 1200 included in the received creating instruction. Then, the screen managing unit 404 stores the created state information 2000 and the created component information 3000 in the screen management information storage unit 405 in step S1701.

The state information 2000 that is created by the screen managing unit 404 according to the second embodiment will be described with reference to FIG. 18. FIG. 18 is a table illustrating an example of the state information 2000 according to the second embodiment.

As illustrated in FIG. 18, the state information 2000 according to the second embodiment includes "CURRENT PAGE", "PREVIOUS PAGE", and "CURRENT SCREEN-ITEM" as data items. A Screen ID of a screen-item including a page currently displayed in the screen of the device 20 is stored as the data item "CURRENT SCREEN-ITEM".

For example, the screen managing unit 404 creates the state information 2000, which sets a Screen ID of a screen-item including a page to be displayed as an initial screen of the single-page application as the "CURRENT SCREEN-ITEM". Specifically, for example, in a case where the Page ID of the page to be displayed as the initial screen of the single-page application is "page1", the Screen ID "screen1" of the screen-item 1 including the page of the "page1" is set as the "CURRENT SCREEN-ITEM".

In this way, the state information 2000 illustrated in FIG. 18 is information that manages the Page ID of the page currently displayed by the device 20, the Page ID of the page that has been displayed immediately before the current page is displayed, and the Screen ID of the screen-item including the page currently displayed.

The component information 3000 that is created by the screen managing unit 404 will be described with reference to FIG. 19. FIG. 19 is a table illustrating an example of the component information 3000 according to the second embodiment.

As illustrated in FIG. 19, the component information 3000 according to the second embodiment includes "SCREEN ID", PAGE ID", "PAGE COMPONENT", "TAB ID", "TAB COMPONENT", and "CURRENT TAB" as data items. Screen IDs for identifying respective screen-items are stored as the data item "SCREEN ID".

In this way, in the component information 3000 illustrated in FIG. 19, page components of pages included in a corresponding screen-item, tab component(s) included in a corresponding page, and a tab ID of a tab displayed last are associated with each screen-items.

Upon creating the state information 2000 and the component information 3000 by the screen managing unit 404, the input receiving unit 401 transmits, to the display processing unit 403 in step S1702, an initial screen transition instruction. Note that the initial screen transition instruction includes the Page ID stored in the "CURRENT PAGE" of the state information 2000 created in the above step S903.

Then, upon receiving the initial screen transition instruction, the display processing unit 403 performs in step S1703 screen transition processing for causing the screen to transition to the initial screen based on the Page ID included in the received initial screen transition instruction. In this way, for example, the screen G110 as illustrated in FIG. 13 is displayed on the operation panel 202 of the device 20 as the initial screen of the single-page application. Note that details of the screen transition processing will be described later below.

As described above, the initial screen of the single-page application is displayed on the device 20 according to the second embodiment based on the screen information 1000 obtained from the server apparatus 10.

Figure 20:
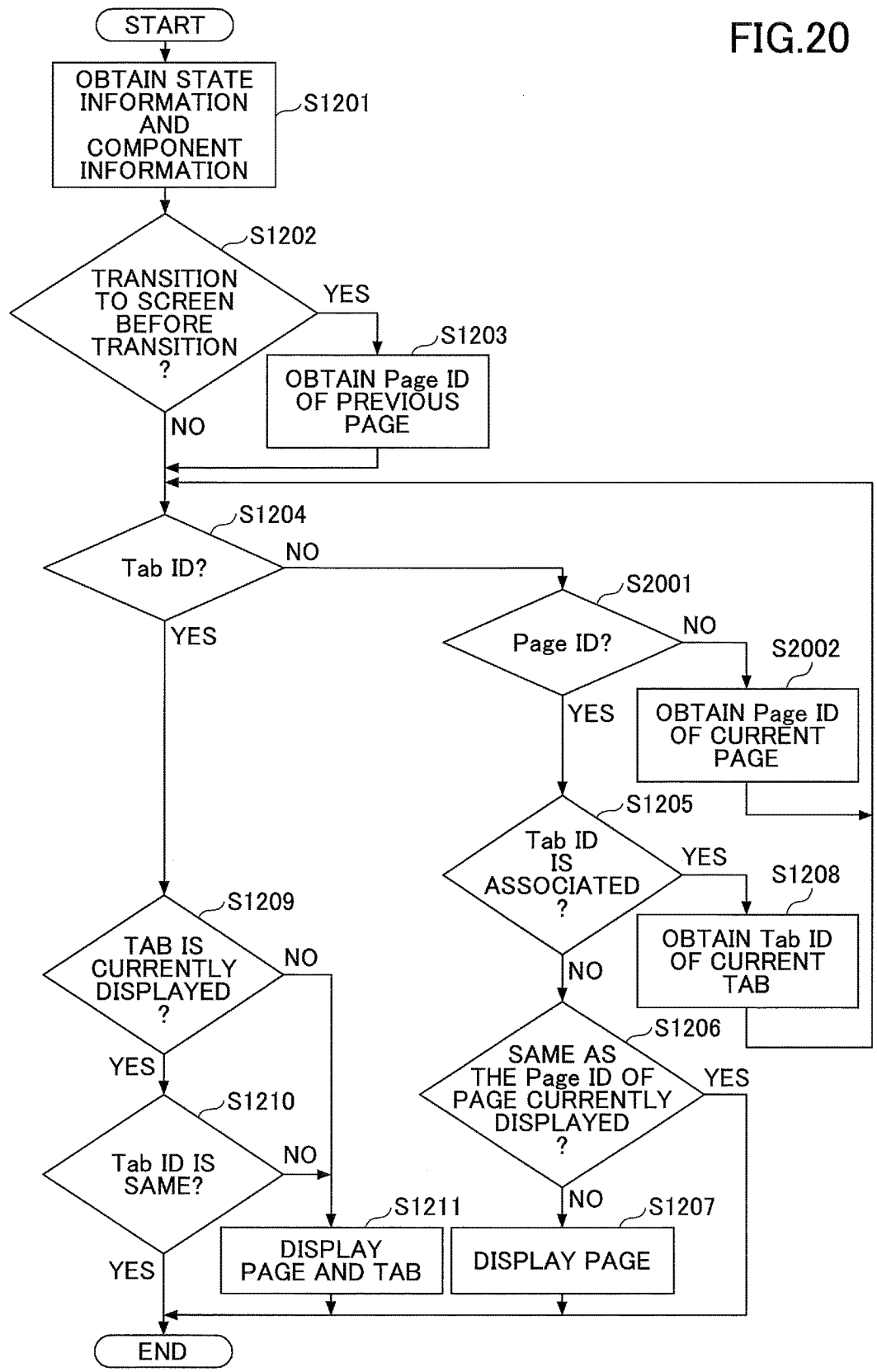
FIG. 20 is a flowchart illustrating an example of screen transition processing according to the second embodiment.

Details of the screen transition processing of step S1403 in FIG. 14 and step S1703 in FIG. 17 will be described with reference to FIG. 20. FIG. 20 is a flowchart illustrating an example of the screen transition processing according to the second embodiment. Note that in FIG. 20, similar to the first embodiment, the initial screen transition instruction and the screen transition instruction are simply referred to as "transition instruction" without distinguishing with each other. Information, which represents a transition destination such as a Screen ID a Page ID and a Tab ID to which the screen transitions included in the transition instruction, is referred to as "transition-destination information".

In a case of determining that the transition-destination information does not represent the Tab ID (No in step S1204: that is, in a case where the transition-destination information represents a Page ID or a Screen ID), the display determining unit 411 determines in step S2001 whether the transition-destination information represents a Page ID.

In a case of determining that the transition-destination information does not represent the Page ID (No in step S2001: that is, in a case where the transition-destination information represents a Screen ID), the display processing unit 403 obtains the Page ID stored in the data item "CURRENT PAGE" of the state information 2000, and sets the obtained Page ID as the transition-destination information in step S2002.

In this way, in steps S1207 and step S1211 in FIG. 20, the device 20 can perform a screen transition including a transition of screens between screen-items.

As described above, according to the Web system 1 of the second embodiment, it is possible to designate an ID such as a Screen ID, a Page ID, and a Tab ID to cause the screen to transition in the device 20 that uses the single-page application that is provided from the server apparatus 10.

Thus, according to the Web system 1 of the second embodiment, it is possible to define, with respect to the page components such as buttons in the respective screens, the Screen IDs, the Page IDs, the Tab IDs, and the like. Thereby, it is possible to easily create a relationship of transitions between the screens in the provided single-page application. Further, a person such as a developer of the single-page application can unify (make) screens used for a common purpose into one screen-item to more easily create the relationship of transitions between the screens.

Although the Web system 1 according to the second embodiment defines the concept called "screen-item" including a plurality of pages in order to describe an example in which three hierarchies of screen-items, pages, and tabs constitute screens, the Web system 1 is not limited to having the three hierarchies. That is, in the Web system 1 according to the embodiment, screens may be constituted with a selectable number of hierarchies.

It should be noted that the above described device 20 according to the embodiments may be realized by a device memory, which stores at least one program, and at least one processor, which executes the at least one program to execute the processing for causing the screen transition as described in the embodiment. For example, the device memory and the at least one processor can implement functions as described in the embodiments and may be implemented by hardware elements as described in the embodiments.

The order of the method of the present disclosure is not limited to the order of processes of the method disclosed in the above described embodiments.

The present disclosure can be implemented in any convenient form, for example using dedicated hardware, or a mixture of dedicated hardware and software. The present disclosure may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Because the present disclosure can be implemented as software, each and every aspect of the present disclosure thus encompasses computer software implementable on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. For example, the CPU may be implemented by one or more processors. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

Here, at least one program may be stored in a non-transitory recording medium for causing the device 20 to execute processing as described in the embodiments.

Further, the present disclosure is not limited to the embodiments described above, but various variations and modifications may be made without departing from the scope of the present disclosure.

What is claimed is:

1. An information processing apparatus coupled to a server apparatus that provides a single-page application via a network, a Web browser being installed on the information processing apparatus, the information processing apparatus comprising:
   a memory; and
   a processor that is coupled to the memory and that is configured to
   cause the Web browser to obtain, from the server apparatus, Web content for displaying pages in the single-page application, the Web content including screen definition information in which content elements are defined for respective page identification information items for identifying the pages and including configuration information in which a configuration between the page identification information items is defined;
   cause the Web browser to create component information based on the configuration information included in the Web content, the component information including, for the respective page identification information items of the pages to be displayed by the Web browser, page components that display the pages; and
   when an operation for a page transition is performed by a user, cause the Web browser to display a page after the transition based on a content element, among the content elements defined in the screen definition information, corresponding to a page identification information item of the page after the transition and based on a page component corresponding to the page identification information item of the page after the transition,
   wherein a predetermined page of the pages includes a plurality of tabs,
   wherein, in the configuration information, a configuration between a page identification information item of the predetermined page and tab identification information items of the respective tabs is defined,
   wherein the component information includes, for the respective tab identification information items, tab components for displaying the tabs,
   wherein upon receiving from the user a selection of a tab from among the plurality of tabs included in the predetermined page, the processor causes the Web browser to display the selected tab and stores, in the memory, a tab identification item of the selected tab in association with the page identification item of the predetermined page, and
   wherein upon the user performing an operation to make a page transition to the predetermined page from another page, the processor causes the Web browser to display, based on the tab identification item of the tab stored in association with the page identification item of the predetermined page, the tab displayed last among the plurality of tabs.

2. The information processing apparatus according to claim 1,
   wherein, in the configuration information, the configuration between the page identification information items, and a configuration between tab identification information items, which identify tabs included in the pages, and the page identification information items of the pages including the tabs are defined,
   wherein the processor causes the Web browser to create the component information based on the configuration information, the component information including the page components that display the pages for the respective page identification information items, and including tab components that display the tabs included in the pages, and
   wherein, when the operation for the page transition is performed by the user, the processor causes the Web browser to display the page after the transition based on the content element, among the content elements defined in the screen definition information, corresponding to the page identification information item of the page after the transition, based on the page component corresponding to the page identification information item of the page after the transition, and based on a tab component corresponding to a tab identification information item of a tab included in the page after the transition.

3. The information processing apparatus according to claim 2,
   wherein the processor causes the Web browser to create the component information based on the configuration information, the component information including the page components that display the pages for the respective page identification information items, including the tab components that display the tabs included in the pages, and including tab identification information items of tabs displayed last among the tabs included in the pages, and
   wherein, when the operation for the page transition is performed by the user, the processor causes the Web browser to display the page after the transition based on the content element, among the content elements defined in the screen definition information, corresponding to the page identification information item of the page after the transition, based on the page component corresponding to the page identification information item of the page after the transition, and based on a tab component corresponding to a tab identification information item of a tab displayed last among tabs included in the page after the transition.

4. The information processing apparatus according to claim 2,
   wherein, in the configuration information, the configuration between the page identification information items is defined so that the page identification information items are parallel to each other, and
   wherein, in the configuration information, the configuration between the page identification information items and the tab identification information items is defined so that a hierarchy of the tab identification information items of the tabs included in the pages is lower than a hierarchy of the page identification information items of the pages including the tabs.

5. The information processing apparatus according to claim 1, wherein the screen definition information is information in which div tags are defined for the respective page identification information items.

6. The information processing apparatus according to claim 5, wherein, when the operation for the page transition is performed by the user, the processor causes the Web browser to display a page component corresponding to an element, among elements represented by the div tags defined in the screen definition information, corresponding to the page identification information item of the page after the transition and causes the Web browser to delete or hide elements other than the element corresponding to the page identification information item of the page after the transition in order to display the page after the transition.

7. The information processing apparatus according to claim 6, wherein the processor makes a value of display property of CSS none to hide each of the other elements.

8. The information processing apparatus according to claim 1, wherein the configuration information is information in which the configuration between the page identification information items is defined in a JSON format.

9. An information processing method that is used by an information processing apparatus coupled to a server apparatus that provides a single-page application via a network, a web browser being installed on the information processing apparatus, the information processing method comprising:
  causing the Web browser to obtain, from the server apparatus, Web content for displaying pages in the single-page application, the Web content including screen definition information in which content elements are defined for respective page identification information items for identifying the pages and including configuration information in which a configuration between the page identification information items is defined;
  causing the Web browser to create component information based on the configuration information included in the Web content obtained, the component information including, for the respective page identification information items of the pages to be displayed by the Web browser, page components that display the pages; and
  causing, when an operation for a page transition is performed by a user, the Web browser to display a page after the transition based on a content element, among the content elements defined in the screen definition information, corresponding to a page identification information item of the page after the transition and based on a page component corresponding to the page identification information item of the page after the transition,
  wherein a predetermined page of the pages includes a plurality of tabs,
  wherein, in the configuration information, a configuration between a page identification information item of the predetermined page and tab identification information items of the respective tabs is defined,
  wherein the component information includes, for the respective tab identification information items, tab components for displaying the tabs,
  wherein upon receiving from the user a selection of a tab from among the plurality of tabs included in the predetermined page, the processor causes the Web browser to display the selected tab and stores, in the memory, a tab identification item of the selected tab in association with the page identification item of the predetermined page, and
  wherein upon the user performing an operation to make a page transition to the predetermined page from another page, the processor causes the Web browser to display, based on the tab identification item of the tab stored in association with the page identification item of the predetermined page, the tab displayed last among the plurality of tabs.

10. A non-transitory recording medium storing a program that causes an information processing apparatus to execute processing, an information processing apparatus being coupled to a server apparatus that provides a single-page application via a network, a web browser being installed on the information processing apparatus, the processing comprising:
  causing the Web browser to obtain, from the server apparatus, Web content for displaying pages in the single-page application, the Web content including screen definition information in which content elements are defined for respective page identification information items for identifying the pages and including configuration information in which a configuration between the page identification information items is defined;
  causing the Web browser to create component information based on the configuration information included in the Web content obtained, the component information including, for the respective page identification information items of the pages to be displayed by the Web browser, page components that display the pages; and
  causing, when an operation for a page transition is performed by a user, the Web browser to display a page after the transition based on a content element, among the content elements defined in the screen definition information, corresponding to a page identification information item of the page after the transition and based on a page component corresponding to the page identification information item of the page after the transition,
  wherein a predetermined page of the pages includes a plurality of tabs,
  wherein, in the configuration information, a configuration between a page identification information item of the predetermined page and tab identification information items of the respective tabs is defined,
  wherein the component information includes, for the respective tab identification information items, tab components for displaying the tabs,
  wherein upon receiving from the user a selection of a tab from among the plurality of tabs included in the predetermined page, the processor causes the Web browser to display the selected tab and stores, in the memory, a tab identification item of the selected tab in association with the page identification item of the predetermined page, and
  wherein upon the user performing an operation to make a page transition to the predetermined page from another page, the processor causes the Web browser to display, based on the tab identification item of the tab stored in association with the page identification item of the predetermined page, the tab displayed last among the plurality of tabs.

* * * * *